US012519514B2

(12) United States Patent
Himmelfarb

(10) Patent No.: US 12,519,514 B2
(45) Date of Patent: Jan. 6, 2026

(54) SYSTEMS, METHODS, AND MEDIA FOR IMPLEMENTING A POWER SENSOR CALIBRATION PROCESS AND ESTIMATING AN AUTO-CORRELATION MATRIX FOR A TRANSCEIVER

(71) Applicant: NovAtel Inc., Calgary (CA)

(72) Inventor: Michael Himmelfarb, Calgary (CA)

(73) Assignee: NovAtel Inc., Calgary (CA)

( * ) Notice: Subject to any disclaimer, the term of this patent is extended or adjusted under 35 U.S.C. 154(b) by 0 days.

(21) Appl. No.: 18/731,254

(22) Filed: Jun. 1, 2024

(65) Prior Publication Data

US 2025/0141505 A1 May 1, 2025

Related U.S. Application Data

(60) Provisional application No. 63/546,887, filed on Nov. 1, 2023.

(51) Int. Cl.
*H04B 7/0456* (2017.01)
*H04L 5/00* (2006.01)

(52) U.S. Cl.
CPC ......... *H04B 7/0465* (2013.01); *H04B 7/0473* (2013.01); *H04L 5/0048* (2013.01)

(58) Field of Classification Search
CPC ...... H04B 7/04; H04B 7/0413; H04B 7/0456; H04B 7/046; H04B 7/0465; H04B 7/0469;

(Continued)

(56) References Cited

U.S. PATENT DOCUMENTS 4,298,873 A * 11/1981 Roberts ............... H01Q 3/2617
342/375
5,694,416 A * 12/1997 Johnson ................... H04B 7/08
342/368

(Continued)

FOREIGN PATENT DOCUMENTS

CN 116631077 A 8/2023
EP 2151070 B1 2/2016

OTHER PUBLICATIONS

McWhirter, "A Brief Review of Adaptive Null Steering Techniques" RSRE Memorandum No. 3939, Malvern, Jul. 17, 1986, 39 pages.

(Continued)

*Primary Examiner* — James M Perez
(74) *Attorney, Agent, or Firm* — Cesari and McKenna, LLP

(57) ABSTRACT

Techniques are provided for implementing a power sensor calibration process and estimating an auto-correlation matrix for a transceiver with a multi-antenna array. Prior to auto-correlation matrix estimating, the power sensors may be calibrated. A different power sensor may measure the power of the signals received at a corresponding antenna of the multi-antenna array. The signals received at one antenna of each unique pair of antennas may be shifted in phase using a plurality (e.g., three) of different phase settings to generate a plurality of different shifted signals for each unique pair of antennas. Each of one or more power sensors, for each unique pair of antennas, may measure different combined powers based on the shifted signals and the RF signals received at the other antenna of the unique pair. A module may use the different combined powers with the power measured for each antenna to estimate the auto-correlation matrix.

20 Claims, 13 Drawing Sheets

(58) Field of Classification Search
CPC ...... H04B 7/0473; H04B 7/08; H04B 7/0837; H04B 7/084; H04B 7/0842; H04B 7/0865; H04L 5/003; H04L 5/0048; H04Q 3/00; H04Q 3/22; H04Q 3/26; H04Q 3/2605; H04Q 3/2652; H04Q 3/2658; H04Q 3/30; H04Q 3/34; H04Q 3/36; H04Q 3/38
See application file for complete search history.

(56) References Cited

U.S. PATENT DOCUMENTS

| | | | | |
|---|---|---|---|---|
| D389,453 S * | 1/1998 | Mitchell | | D13/100 |
| 5,861,843 A * | 1/1999 | Sorace | | H01Q 3/28 |
| | | | | 342/174 |
| 6,188,352 B1 * | 2/2001 | Choi | | H04B 7/0865 |
| | | | | 342/378 |
| 6,590,528 B1 * | 7/2003 | DeWulf | | G01S 19/36 |
| | | | | 342/383 |
| 7,605,753 B2 * | 10/2009 | Landmark | | G01S 19/21 |
| | | | | 342/357.59 |
| 7,848,387 B2 * | 12/2010 | Jonsson | | H04B 7/0634 |
| | | | | 375/150 |
| 8,045,926 B2 * | 10/2011 | Martikkala | | H04B 17/327 |
| | | | | 455/63.4 |
| 8,660,060 B2 * | 2/2014 | Sanayei | | H04B 7/0417 |
| | | | | 370/321 |
| 8,755,454 B2 * | 6/2014 | Sorrells | | H04B 7/10 |
| | | | | 375/295 |
| 8,811,243 B2 * | 8/2014 | Lysejko | | H04L 5/0073 |
| | | | | 370/328 |
| 8,811,461 B1 * | 8/2014 | Huynh | | H04B 17/14 |
| | | | | 375/224 |
| 8,908,753 B2 * | 12/2014 | Li | | H04B 17/21 |
| | | | | 375/224 |
| 9,082,014 B2 * | 7/2015 | Terrazas | | G06V 20/176 |
| 9,344,168 B2 * | 5/2016 | Abreu | | H04B 7/086 |
| 9,378,509 B2 * | 6/2016 | Terrazas | | G06Q 30/0203 |
| 9,419,692 B2 * | 8/2016 | Sorrells | | H01Q 21/061 |
| 9,547,866 B2 * | 1/2017 | Terrazas | | G06Q 30/0205 |
| 9,667,455 B1 * | 5/2017 | Levakov | | H04L 25/03891 |
| 9,866,259 B1 * | 1/2018 | Margomenos | | H04B 1/40 |
| 9,929,757 B2 * | 3/2018 | Belostotski | | H03D 7/1441 |
| 10,009,088 B2 * | 6/2018 | Rahman | | H04B 7/0469 |
| 10,236,574 B2 * | 3/2019 | Chen | | H02J 50/23 |
| 10,243,628 B2 * | 3/2019 | Reed | | H04B 7/043 |
| 10,250,303 B2 * | 4/2019 | Wu | | H04B 7/0469 |
| 10,270,510 B1 * | 4/2019 | Wang | | H04B 7/0617 |
| 10,313,034 B2 * | 6/2019 | Rodriguez-Herrera | | H04B 17/391 |
| 10,317,449 B2 * | 6/2019 | Himmelfarb | | G01R 29/26 |
| 10,355,740 B2 * | 7/2019 | Yamaguchi | | H04B 17/21 |
| 10,447,360 B2 * | 10/2019 | Li | | H04B 7/04 |
| 10,469,109 B2 * | 11/2019 | Gutman | | H03F 3/24 |
| 10,547,358 B2 * | 1/2020 | Forenza | | H04B 7/024 |
| 10,700,762 B2 * | 6/2020 | Girnyk | | H01Q 1/246 |
| 10,833,750 B2 * | 11/2020 | Bhamidipati | | H04B 7/0617 |
| 11,121,780 B2 * | 9/2021 | Baccouche | | H04B 17/11 |
| 11,163,050 B2 * | 11/2021 | Bharadia | | G01S 13/42 |
| 11,190,327 B2 * | 11/2021 | Lu | | H04J 13/0062 |
| 11,349,533 B2 * | 5/2022 | Bhamidipati | | H01Q 1/2291 |
| 11,431,422 B2 * | 8/2022 | Hong | | H04L 25/0202 |
| 11,563,480 B2 * | 1/2023 | Girnyk | | H01Q 1/246 |
| 11,664,958 B2 * | 5/2023 | Lu | | H04L 5/001 |
| | | | | 370/329 |
| 12,041,460 B2 * | 7/2024 | Montalvo | | H04W 28/0925 |
| 12,057,892 B2 * | 8/2024 | Chervyakov | | H04W 24/06 |
| 12,068,796 B2 * | 8/2024 | Ghozlan | | H04L 5/0048 |
| 12,120,529 B1 * | 10/2024 | Montalvo | | H04W 72/0453 |
| 12,126,407 B2 * | 10/2024 | Zhang | | H04B 7/043 |
| 12,156,037 B2 * | 11/2024 | Montalvo | | H04W 28/0967 |
| 12,156,136 B2 * | 11/2024 | Ye | | H04J 13/0029 |
| 12,250,559 B2 * | 3/2025 | Montalvo | | H04W 28/0925 |
| 12,262,214 B2 * | 3/2025 | Montalvo | | H04B 17/373 |
| 12,289,603 B2 * | 4/2025 | Montalvo | | H04W 16/10 |
| 12,294,865 B2 * | 5/2025 | Montalvo | | H04B 17/3913 |
| 12,309,598 B2 * | 5/2025 | Montalvo | | H04W 16/10 |
| 12,323,191 B2 * | 6/2025 | Chen | | H04B 17/13 |
| 12,328,591 B2 * | 6/2025 | Montalvo | | H04W 24/02 |
| 12,348,975 B2 * | 7/2025 | Montalvo | | H04W 24/08 |
| 2004/0085933 A1 * | 5/2004 | Wang | | H01Q 1/288 |
| | | | | 370/334 |
| 2006/0227891 A1 * | 10/2006 | Niu | | H04L 25/0226 |
| | | | | 375/267 |
| 2007/0140389 A1 * | 6/2007 | Lindenmeier | | H04B 7/084 |
| | | | | 375/347 |
| 2007/0211816 A1 * | 9/2007 | Hwang | | H04B 7/0671 |
| | | | | 375/267 |
| 2008/0174477 A1 * | 7/2008 | Landmark | | G01S 19/21 |
| | | | | 342/357.59 |
| 2010/0227562 A1 * | 9/2010 | Shim | | H04L 25/03993 |
| | | | | 455/63.1 |
| 2010/0246494 A1 * | 9/2010 | Sanayei | | H04B 7/0469 |
| | | | | 370/328 |
| 2012/0082061 A1 * | 4/2012 | Lysejko | | H04W 24/02 |
| | | | | 370/254 |
| 2012/0155512 A1 * | 6/2012 | Giannakis | | H04B 7/066 |
| | | | | 375/E1.003 |
| 2013/0301915 A1 * | 11/2013 | Terrazas | | G06V 20/13 |
| | | | | 382/173 |
| 2014/0270355 A1 * | 9/2014 | Terrazas | | G06Q 30/0205 |
| | | | | 382/103 |
| 2015/0226856 A1 * | 8/2015 | Zarowski | | G01S 19/21 |
| | | | | 342/357.59 |
| 2015/0269598 A1 * | 9/2015 | Terrazas | | G06V 20/176 |
| | | | | 705/7.34 |
| 2015/0280801 A1 * | 10/2015 | Xin | | H04B 7/0481 |
| | | | | 370/329 |
| 2016/0080052 A1 * | 3/2016 | Li | | H04B 7/0632 |
| | | | | 375/267 |
| 2017/0019154 A1 * | 1/2017 | Reed | | H04B 7/0413 |
| 2017/0310348 A1 * | 10/2017 | Belostotski | | H04B 1/10 |
| 2017/0331531 A1 * | 11/2017 | Wu | | H04B 7/0469 |
| 2018/0024177 A1 * | 1/2018 | Himmelfarb | | G01R 29/26 |
| | | | | 324/613 |
| 2018/0097558 A1 * | 4/2018 | Girnyk | | H04B 7/10 |
| 2019/0082440 A1 * | 3/2019 | Han | | H04B 7/0639 |
| 2019/0115989 A1 * | 4/2019 | Rodriguez-Herrera | | H04B 17/11 |
| 2019/0173538 A1 * | 6/2019 | Wu | | H04B 7/0626 |
| 2019/0214724 A1 * | 7/2019 | Schrattenecker | | G01S 7/4017 |
| 2020/0106493 A1 * | 4/2020 | Bhamidipati | | H01Q 1/2291 |
| 2020/0106506 A1 * | 4/2020 | Bhamidipati | | H04B 7/0456 |
| 2020/0280384 A1 * | 9/2020 | Kilambi | | H04J 13/18 |
| 2020/0336270 A1 * | 10/2020 | Lu | | H04L 5/0051 |
| 2021/0013956 A1 * | 1/2021 | Girnyk | | H04W 52/42 |
| 2021/0058140 A1 * | 2/2021 | Schwab | | H04W 16/28 |
| 2021/0234620 A1 * | 7/2021 | Baccouche | | H04B 17/0085 |
| 2022/0057502 A1 * | 2/2022 | Oishi | | G01S 13/765 |
| 2022/0085962 A1 * | 3/2022 | Lu | | H04L 5/0048 |
| 2022/0123847 A1 * | 4/2022 | Ghozlan | | H04B 17/318 |
| 2022/0131727 A1 * | 4/2022 | Khoryaev | | H04L 27/261 |
| 2022/0140967 A1 * | 5/2022 | Khoryaev | | H04W 56/002 |
| | | | | 375/220 |
| 2022/0167270 A1 * | 5/2022 | Ye | | H04W 68/02 |
| 2022/0209836 A1 * | 6/2022 | Kovacic | | H04B 1/04 |
| 2023/0208535 A1 * | 6/2023 | Raghavan | | H04B 17/12 |
| 2024/0163679 A1 * | 5/2024 | Montalvo | | H04W 72/0453 |
| 2024/0163680 A1 * | 5/2024 | Montalvo | | H04W 24/08 |
| 2024/0244453 A1 * | 7/2024 | Montalvo | | H04W 16/14 |
| 2024/0298184 A1 * | 9/2024 | Montalvo | | H04W 16/10 |
| 2024/0357365 A1 * | 10/2024 | Montalvo | | H04W 24/08 |
| 2024/0373235 A1 * | 11/2024 | Montalvo | | H04W 72/0453 |
| 2024/0388923 A1 * | 11/2024 | Montalvo | | H04W 24/08 |
| 2024/0397332 A1 * | 11/2024 | Montalvo | | H04W 24/04 |
| 2024/0414553 A1 * | 12/2024 | Montalvo | | H04W 24/04 |
| 2024/0430688 A1 * | 12/2024 | Montalvo | | H04W 16/10 |
| 2024/0430689 A1 * | 12/2024 | Montalvo | | H04B 17/354 |
| 2025/0055523 A1 * | 2/2025 | Zhao | | H04B 7/0691 |
| 2025/0063373 A1 * | 2/2025 | Montalvo | | H04W 24/08 |
| 2025/0141504 A1 * | 5/2025 | Himmelfarb | | H04L 5/0048 |
| 2025/0141505 A1 * | 5/2025 | Himmelfarb | | H04B 7/0465 |

(56) References Cited

U.S. PATENT DOCUMENTS

| | | | |
|---|---|---|---|
| 2025/0141568 A1* | 5/2025 | Chen | H04B 17/13 |
| 2025/0159488 A1* | 5/2025 | Montalvo | H04B 17/3913 |
| 2025/0175230 A1* | 5/2025 | Fan | H04B 7/0456 |
| 2025/0175808 A1* | 5/2025 | Montalvo | H04W 16/14 |
| 2025/0220473 A1* | 7/2025 | Jiang | H04L 5/0048 |

OTHER PUBLICATIONS

Curran et al., "Analog and Digital Nulling Techniques for Multi-Element Antennas in GNSS Receivers", European Commission, Joint Research Centre (JRC), Ispra (VA), Italy, 2015, 14 pages.

Quispe, "Implementation of Null Steering Algorithms in a Compact Analog Array", thesis, Montana State University, Apr. 2014, 61 pages.

McMilin, Emily, De Lorenzo, David S., Lee, Thomas, Enge, Per, Akos, Dennis, Caizzone, Stefano, Konovaltsev, Andriy, "GPS Anti-Jam: A Simple Method of Single Antenna Null-Steering for Aerial Applications," Proceedings of the ION 2015 Pacific PNT Meeting, Honolulu, Hawaii, Apr. 2015, pp. 470-483.

Kadhum, Maha. (2018). Null steering using phase shifters. ARPN Journal of Engineering and Applied Sciences. 13. 3045-3051.

Cheah, Yoo Chong, Realisation of an automatic null steering antenna array at 10.5 GHz, Doctor of Philosophy thesis, Department of Electrical and Computer Engineering, University of Wollongong, 1984. https://ro.uow.edu.au/theses/1347.

C. Fernández-Prades, J. Arribas and P. Closas, "Robust GNSS Receivers by Array Signal Processing: Theory and Implementation," in Proceedings of the IEEE, vol. 104, No. 6, pp. 1207-1220, Jun. 2016.

Extended European Search Report mailed May 28, 2025 for European Patent Application. No. 24203130.0 for NovAtel, Inc., 7 pages.

* cited by examiner

SYSTEMS, METHODS, AND MEDIA FOR IMPLEMENTING A POWER SENSOR CALIBRATION PROCESS AND ESTIMATING AN AUTO-CORRELATION MATRIX FOR A TRANSCEIVER

CROSS-REFERENCE TO RELATED APPLICATIONS

The present application claims the benefit of U.S. Provisional Patent Application Ser. No. 63/546,887, which was filed on Nov. 1, 2023, for "ANALOG ANTI-JAM GNSS ANTENNA", which is hereby incorporated by reference.

The present application is related to the following commonly assigned U.S. patent application Ser. No. 18/731,252, which was filed on Jun. 1, 2024, for SYSTEMS, METHODS, AND MEDIA FOR ESTIMATING AN AUTO-CORRELATION MATRIX FOR A TRANSCEIVER, which is hereby incorporated by reference.

BACKGROUND

Technical Field

The invention relates generally to transceivers, and in particular, to implementing a power sensor calibration process and estimating an auto-correlation matrix for a transceiver.

Background Information

An auto-correlation matrix is used for many applications associated with phased-array antenna systems. Such applications may include, but are not limited to, beamformer steering, interference mitigation (e.g., one or a plurality of jammers), multi-path mitigation, identifying locations of signal sources, Multiple-Signal-Classification (MUSIC), Estimation of Signal Parameters via Rotational Invariance Techniques (ESPRIT), Time-difference of arrival (TDOA), etc. Therefore, accurately and efficiently estimating the autocorrelation matrix is important as it affects the system's ability to effectively implement the above-described applications.

Phase and amplitude offsets between antennas are imprinted on the carrier wave of signals incident onto a phased array. Therefore, and to measure the offsets and estimate the auto-correlation matrix, conventional systems and techniques typically operate in the voltage domain after in-phase/quadrature (IQ) demodulation. For example, conventional systems and techniques require the use of high-speed analog-to-digital converters (e.g., 100 mega-samples per second) to digitize, in near real-time, the incoming analog signals (e.g., navigation signals) into digital samples in the voltage domain. Conventional systems and techniques can then use the IQ digital samples to calculate the auto-correlation matrix using statistical methods.

The use of the required high-speed analog to digital converters and then calculating auto-correlation values is expensive in terms of processing hardware, power, and cost. Therefore, what is needed is an efficient and less expensive (e.g., in terms of processing hardware, power, and cost) technique for estimating the autocorrelation matrix.

Additionally, there are factors that affect a power sensor's ability to accurately estimate power. These factors can include, but are not limited to, environmental conditions (e.g., temperature), age/wear of the components, insertion loss, linearity, noise, etc. For example, the length of the path from the antenna port to the power sensor, the type of transmission line used from the antenna port to the power sensor, and the components/devices that are inserted in the path from the antenna port to the power sensor can all affect, e.g., decrease, the signal power that is measured at the power sensor. For example, the inclusion of a phase shifter and/or amplitude corrector on a path from the antenna port to the power sensor can affect the power that is measured at the downstream power sensor.

The above described non-ideal factors associated with a power sensor and that result in the inaccuracies and inconsistencies in the power sensor's measurements are input referred to the antenna and must be accounted for (i.e., calibrated for) to provide accurate antenna input measurements.

To that end, a power sensor operates over a range of input powers that are incident on the antenna and received at the power sensor. An uncalibrated power sensor is one that does not compensate for the inaccuracies in the power sensor's measured outputs based on the non-ideal factors as described above. That is, an uncalibrated power sensor will exhibit inconsistencies and inaccuracies in its measured outputs across its operating range due to the non-ideal factors.

Typically, an uncalibrated power sensor exhibits non-linearity. Non-linearity refers to the deviation of the measured outputs, at particular points over the operating range, from a linear profile, i.e., a linear relationship between the input signal and the power sensor's output. That is, the measured output does not follow a straight line when plotted against the input signal over the operating range.

Calibration is the process of applying adjustments/corrections to the power sensor's outputs across the operating range to account for (i.e., compensate for) the non-ideal factors to ensure accurate and reliable measurement outputs. Outputs from a calibrated power sensor typically exhibit linearity over the operating range. Therefore, a linearized power sensor implies that the power measurements output by the power sensor are directly proportional to the actual power of the signal being measured. As a result, a linearized power sensor ensures that the power measurement values are reliable and consistent across the power sensor's operating range.

Related to this, non-linearity in power sensor measurements results in less accuracy because it introduces errors in the relationship between the input signal and the power sensor's output measurements. That is, linearity in the power measurements means that the relationship between the input signal and the power's sensor output measurements is consistent across the entire operating range of the power sensor, and from antenna to antenna.

Therefore, what is also needed is an efficient technique that accounts for, i.e., calibrates for, the non-ideal factors such that the power measurements are accurate and reliable. This in turn ensures that the auto-correlation matrix, which is estimated using the calibrated power measurements, is sufficiently accurate and reliable when used with different applications, e.g., applications associated with phased-array antenna systems.

SUMMARY

Techniques are provided for implementing a power sensor calibration process and estimating an auto-correlation matrix for a transceiver according to the one or more embodiments as described herein. Specifically, the transceiver may be coupled to a multi-antenna array that includes a plurality of antennas. Each antenna may receive signals (RF signals). The transceiver may implement one or more functions based on the received signals, wherein the functions require the use of an auto-correlation matrix. As will be described in further detail below, the one or more embodiments as described herein may utilize power measurements obtained in the RF domain to estimate the correlation matrix more efficiently and less expensively than conventional systems and techniques. In an embodiment, and prior to estimating the auto-correlation matrix, a power sensor calibration process can be performed to account for the non-ideal factors that negatively impact the power measurements made by the power sensors of the transceiver.

A transceiver may include a different power sensor for each antenna of the multi-antenna array. Each power sensor may be referred to as an antenna assigned power sensor. Each power sensor, i.e., antenna assigned power sensor, may measure the power of the signals received at its respective antenna. The transceiver may also include one or more power sensors for each unique pair of antennas. The one or more power sensors for each unique pair of antennas may be referred to as one or more combined power sensors. The signals received at one antenna of each unique pair of antennas may be shifted based on a plurality of different phase offsets (i.e., settings) to generate a plurality of different shifted signals. In an embodiment, the plurality of different phase offsets are 0, $\pi/2$, and $\pi$ (radians) which are used to generate three shifted signals for one antenna of each unique pair of antennas.

The one or more power sensors, i.e., one or more combined power sensors, for each unique pair of antennas may measure a combined power of each of the shifted signals and the signal received at the other antenna of the unique pair of antennas. As such, a plurality (e.g., three) of combined power measurements are made for each unique pair of antennas of the multi-antenna array.

In an embodiment, the transceiver may optionally include an amplitude corrector and/or an RF power combiner. The amplitude corrector may correct the amplitude of each shifted signal to generate a plurality (e.g., three) of corrected signals. Alternatively, the shifted signals may be corrected in amplitude in a variety of different ways to generate the plurality of corrected signals.

Each corrected signal and the signal from the other antenna of the unique pair may be combined by a corresponding RF power combiner to generate a plurality (e.g., three) of combined signals. Thereafter, the one or more power sensors, i.e., one or more combined power sensors, for each unique pair of antennas may measure the combined power of the plurality (e.g., three) of combined signals output from the RF power combiner. Therefore, and in this embodiment with an amplitude corrector and/or RF combiner, a plurality (e.g., three) of combined power measurements are also made for each unique pair of antennas of the multi-antenna array.

The transceiver may include a module (e.g., a correlation module) that is executed by a processor of the transceiver. The module may use the plurality (e.g., three) of power measurements for each unique pair of antennas to solve a system of power equations to calculate three unknowns that relate to the characteristics of the corresponding unique pair of antennas. The module may use the three unknowns for each unique pair of antennas to calculate a maximum power and a minimum power for the corresponding unique pair of antennas. Alternatively, the module may use a search technique (e.g., maximum and/or minimum search technique) to identify the maximum and minimum powers, for the corresponding unique pair of antennas, from the plurality of combined power measurements taken for the corresponding unique pair of antennas at a plurality of different phase offsets that are based on a selected offset interval.

The module may use the maximum power and the minimum power for each unique pair of antennas to estimate an auto-correlation for the corresponding unique pair of antennas.

The module may then estimate the auto-correlation matrix for the multi-antenna array using the auto-correlation estimated for each unique pair of antennas and the power measured for each antenna of the multi-antenna array. Optionally, the transceiver may implement a function using the auto-correlation matrix estimated according to the one or more embodiments as described herein.

In an embodiment, the module may also, prior to estimating the auto-correlation matrix, perform a power sensor calibration process to account for the non-ideal factors that negatively impact the power measurements made by the power sensors of the transceiver. The power sensor calibration process may include a power sensor sweep portion. For the power sensor sweep portion, the module may identify a function (e.g., polynomial function) for each set of power measurements that are generated for a power sensor based on a plurality of RF signals that are generated with different power values. The different power values may be based on a selected power range with a predetermined increment.

In an embodiment, the coefficients of the identified polynomial function may be used to calibrate power measurements generated by the corresponding power sensor. For example, the power measurements for an antenna assigned power sensor may be calibrated using the coefficients of the polynomial function identified for the antenna assigned power sensor. Power measurements calibrated using the coefficients may be referred to as coefficient calibrated power measurements. For the combined power sensor for each unique pair of antennas, additional portions of the power sensor calibration process, as described in further detail below, may be performed to account for other non-ideal factors (e.g., phase shifter and amplitude corrector) along either of the two paths to the combined power sensor. As such, the coefficient calibrated power measurements for the combined sensors may be further calibrated to account for the other non-ideal factors.

The power sensor calibration process may further include a phase shifter insertion loss portion. For the phase shifter insertion loss portion, the module may determine an insertion loss for each phase shifter at each of a plurality of different phase settings. Each phase shifter may correspond to a particular unique pair of antennas, a particular amplitude corrector, and a particular combined power sensor. The insertion loss for a particular phase shifter at a particular phase setting may be determined using the coefficient calibrated power measurements for the particular combined power sensor corresponding to the particular phase shifter at the particular phase setting.

The power sensor calibration process may also include a phase and amplitude adjustment portion for each unique pair of antennas. For the phase and amplitude adjustment portion, the insertion loss determined for a particular phase shifter at each of the different phase settings may be utilized to determine an insertion loss correction that may be applied to the corresponding amplitude corrector. Specifically, the insertion loss corrections may be used to calibrate the coefficient calibrated power measurements of the combined power sensor to generate a plurality of insertion loss calibrated power measurements. The plurality of insertion loss calibrated power measurements for the corresponding combined power sensor may together constitute a data set for the unique pair of antennas. As such, a data set is generated for each unique pair of antennas that may be represented as a curve in 2D space as a construct and de-constructive interference pattern of measured power as a function of phase.

The module may adjust each curve in phase and amplitude to align all of the generated curves with a baseline power sensor profile. The adjustments to a curve for a unique pair of antennas in terms of phase and amplitude may be referred to as a phase alignment correction and an amplitude alignment correction. The alignment corrections (e.g., phase alignment and amplitude alignment corrections) determined for a curve of a combined power sensor may be applied to the insertion loss calibrated power measurements, which results in the generation of a calibrated combined power measurements for the combined power sensor corresponding to the unique pair of antennas.

Therefore, the power measurements of the antenna assigned power sensors can be calibrated to generate coefficient calibrated power measurements. Additionally, combined power measurements of the combined power sensors can be calibrated based on the power sensor calibration process as described herein to generate calibrated combined power measurements. As a result, the auto-correlation matrix, estimated based on the calibrated power measurements, is reliable and accurate for use with different applications associated with phased-array antenna systems.

DETAILED DESCRIPTION OF AN ILLUSTRATIVE EMBODIMENT

Figure 1:
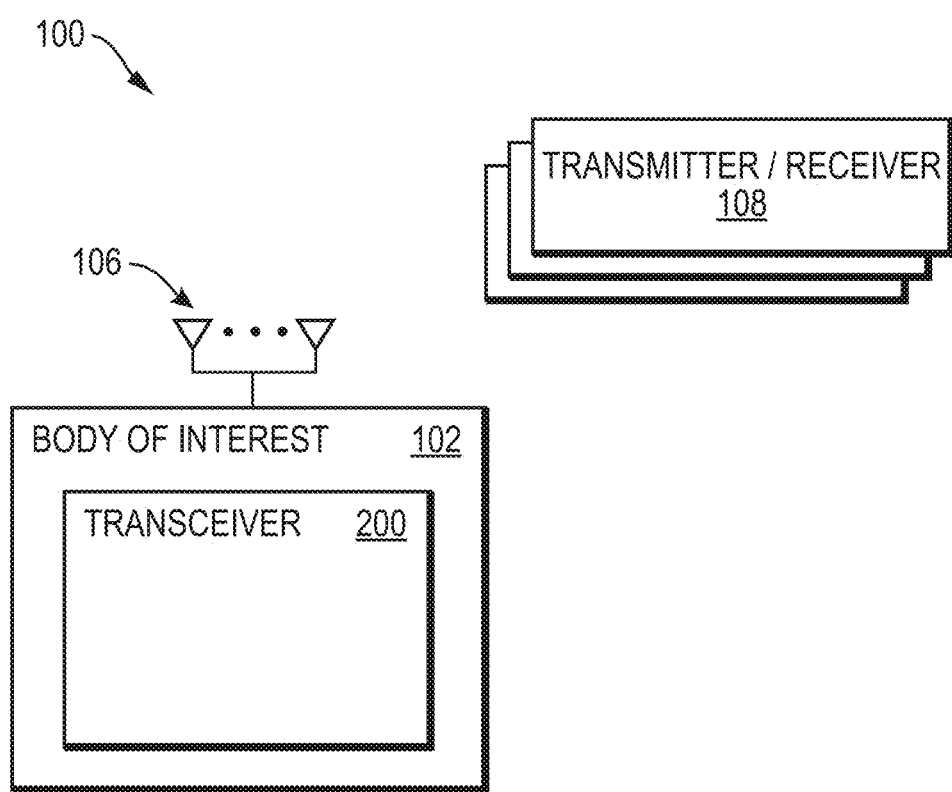
FIG. 1 is an illustration of an example system environment for implementing a power sensor calibration process and estimating an auto-correlation matrix for a transceiver according to the one or more embodiments as described herein.

FIG. 1 is an illustration of an example system environment for implementing a power sensor calibration process and estimating an auto-correlation matrix for a transceiver according to the one or more embodiments as described herein. System environment 100 includes transceiver 200 with a coupled multi-antenna array 106. The ellipsis between the two antennas of the multi-antenna array 106 is used to indicate that multi-antenna array 106 may include any number of a plurality of antennas. Each of the plurality of antennas of multi-antenna array 106 may be configured to transmit and/or receive one or more signals to/from one or more transmitters/receivers 108. It should be expressly understood that multi-antenna array, phase-array antenna, antenna array, antenna array system, etc. may be used interchangeably, and each is meant to indicate a system that includes at least multi-antenna array 106 with a plurality of antennas.

In an embodiment, the one or more transmitters/receivers 108 may be one or more Global Navigation Satellite System (GNSS) satellites that transmit one or more navigation signals, e.g., GNSS satellite signals (not shown). Although reference may be made to transmitters/receivers 108 being GNSS satellites transmitting GNSS satellite signals, it is expressly contemplated that the one or more embodiments as described herein may be utilized with any of a variety of different types of transmitters/receivers 108. For example, transmitters/receivers 108 may be terrestrial transmitters/receivers that transmit and/or receive any of a variety of different signals such as, but not limited to, navigation signals. As such, the description of transmitters/receivers 108 being GNSS satellites that transmit GNSS signals should be taken for illustrative purposes only.

In an embodiment, transceiver 200 may be a navigation receiver. The navigation receiver may, based on the reception of signals at multi-antenna array 106, produce raw measurements (e.g., GNSS raw measurements), such as pseudoranges, carrier phases (e.g., differenced carrier phase measurements), and Doppler velocities; position (e.g., GNSS position), velocity (e.g., GNSS velocity), attitude, and time (e.g., GNSS time), position covariance, time covariance, and velocity covariance; and, as appropriate, GNSS observables.

Transceiver 200 may implement one or more functions that require the use of an auto-correlation matrix. Such functions may include, but are not limited to, beamformer steering, interferer mitigation steering (e.g., one or a plurality of jammers), multipath mitigation, identifying locations of signal sources, Multiple-Signal-Classification (MUSIC), Estimation of Signal Parameters via Rotational Invariance Techniques (ESPRIT), Time-difference of arrival (TDOA), etc.

As will be described in further detail below in relation to FIGS. 2A-2C, 3A, 3B, and 4, a module (e.g., correlation module 214) can estimate an auto-correlation matrix for transceiver 200 using a plurality of power measurements obtained in a radio frequency (RF) domain. Because the auto-correlation matrix can be estimated in the RF domain and directly from the signals received at the multi-antenna array 106 as will be described in further detail below, the signals do not need to be demodulated (no heterodyne converters required), digitized (no high speed ADCs required), or processed at baseband speeds (no FPGAs required) as is required by conventional systems and techniques.

As such, the one or more embodiments as described herein for estimating an auto-correlation matrix for a transceiver is more efficient and less expensive (e.g., in terms of processing hardware, power, and cost) when compared to conventional systems and techniques. As a result, the one or more embodiments as described herein provide an improvement in the existing technological field of transceiver device operation. Stated another way, the one or more embodiments as described herein can estimate the auto-correlation matrix in a manner that is more efficient and less expensive when compared to conventional systems and techniques. Therefore, the one or more embodiments as described herein provide an improvement in the existing technological field for transceiver devices that require the use of an auto-correlation matrix for implementing one or more transceiver functions (e.g., beamformer steering, interference mitigation steering, identifying locations of signal sources, MUSIC, ESPRIT, TDOA, etc.).

Additionally, and as will be described in further detail below in relation to FIGS. 5A, 5B, 6, 7, 8A, and 8B, the module (e.g., correlation module 214) can, prior to estimating the auto-correlation matrix, perform a power sensor calibration process to account for the non-ideal factors that negatively impact the power measurements made by the power sensors of the transceiver.

Figure 2A:
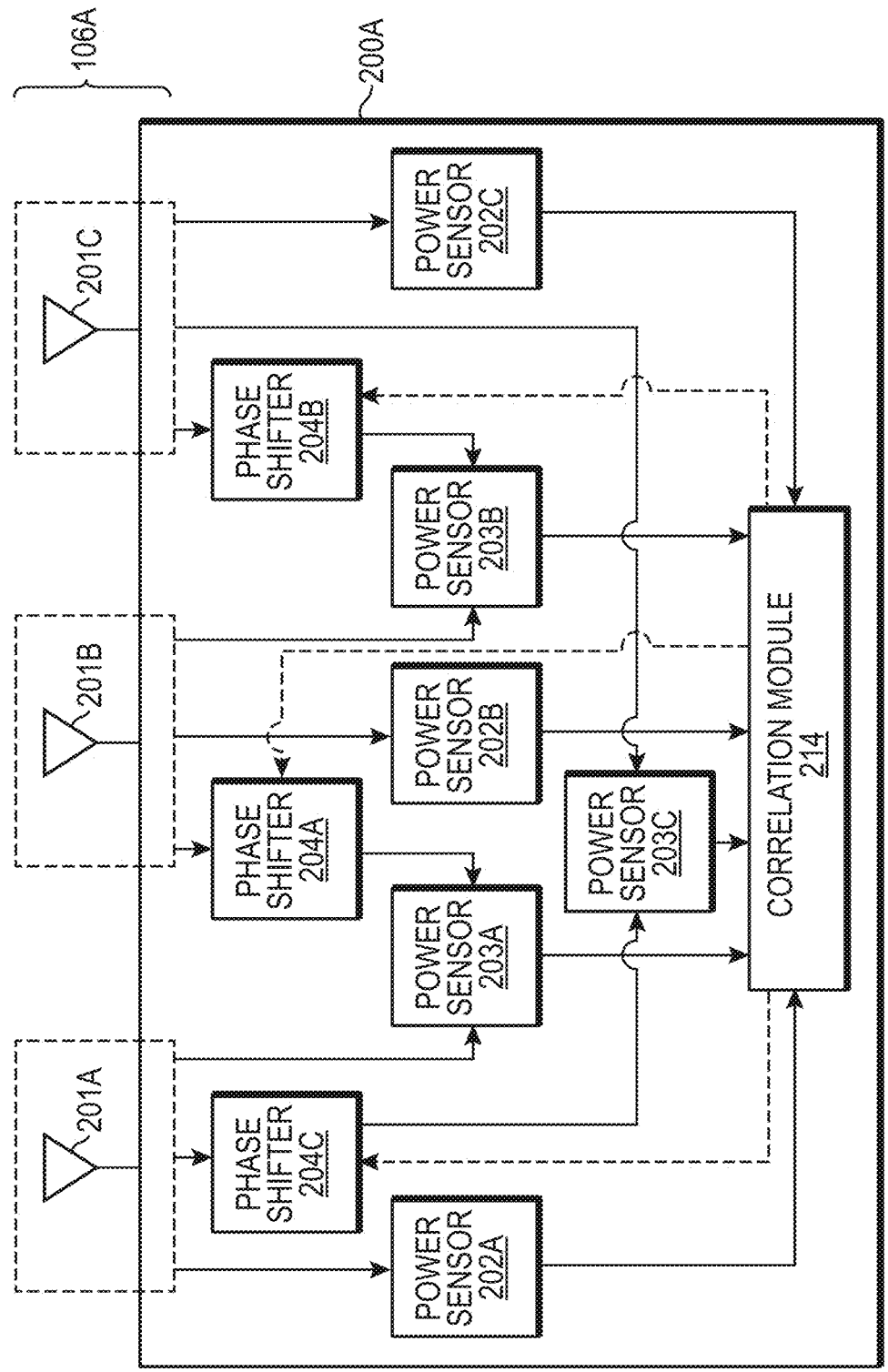
FIG. 2A is an example transceiver with a multi-antenna array, having three antennas, for estimating an auto-correlation matrix according to the one or more embodiments as described herein.

FIG. 2A is an example transceiver 200A with a multi-antenna array 106A, having three antennas, for estimating an auto-correlation matrix according to the one or more embodiments as described herein. As depicted in FIG. 2A, multi-antenna array 106A includes antennas 201A, 201B, and 201C. For clarity and ease of understanding, a dashed box is provided around each of antennas 201A, 201B, and 201C to indicate that any line from a dashed box represents a path from the corresponding antenna to a power sensor or a phase shifter in FIG. 2A. Each of the paths in FIG. 2A, which may be indicated with an arrow, may be a cable, wire, or some other type of connection.

For example, and as depicted in FIG. 2A, there may be a path from (1) an antenna to a power sensor, (2) from an antenna to a phase shifter, (3) from a phase shifter to a power sensor, and (4) from a power sensor to correlation module 214. As will be described in further detail below, each of the power sensors in FIG. 2A may measure, i.e., determine, power. Additionally, and as will be described in further detail below, each phase shifter may, based on a phase offset, shift signals that are received at an antenna in phase and in amplitude. In an embodiment, the signals received at antennas 201A, 201B, and 201C may be RF signals, i.e., signals in the RF domain. For example, antennas 201A, 201B, and 201C may receive signals from transmitters/receivers 108 of FIG. 1. In an embodiment, the signals may be navigation signals.

As depicted in FIG. 2A, transceiver 200A includes a separate and dedicated power sensor for each of antennas 201A, 201B, and 201C. Specifically, power sensor 202A may correspond to antenna 201A and may measure the power of the signals (e.g., RF signals) received at antenna 201A. Power sensor 202B may correspond to antenna 201B and may measure the power of the signals (e.g., RF signals) received at antenna 201B. Power sensor 202C may correspond to antenna 201C and may measure the power of the signals (e.g., RF signals) received at antenna 201C. The powers measured at power sensors 202A-202C may be provided to correlation module 214 as depicted in FIG. 2A. In an embodiment, each of power sensors 202A-202C may be referred to as an antenna assigned power sensor.

As depicted in FIG. 2A, transceiver 200A also includes a different power sensor and a different phase shifter for each unique pair of antennas of multi-antenna array 106A. In this example, the unique pairs of antennas include (1) antenna 201A and antenna 201B, (2) antenna 201B and antenna 201C, and (3) antenna 201A and 201C.

Therefore, and in the example of FIG. 2A, transceiver 200A includes phase shifter 204A and power sensor 203A for the unique pair of antennas 201A and 201B. Phase shifter 204A shifts the signals that are received at antenna 201B in phase and in amplitude to generate shifted signals. Power sensor 203A may then measure a combined power of a shifted signal, corresponding to the signals received at antenna 201B, and a signal received at antenna 201A as depicted in FIG. 2A.

Transceiver 200A further includes phase shifter 204B and power sensor 203B for the unique pair of antennas 201B and 201C. Phase shifter 204B shifts the signals that are received at antenna 201C in phase and in amplitude to generate shifted signals. Power sensor 203B may then measure a combined power of a shifted signal, corresponding to the signals received at antenna 201C, and a signal received at antenna 201B as depicted in FIG. 2A.

Transceiver 200A also includes phase shifter 204C and power sensor 203C for the unique pair of antennas 201A and 201C. Phase shifter 204C shifts the signals that are received at antenna 201A in phase and in amplitude to generate shifted signals. Power sensor 203C may then measure a combined power of a shifted signal, corresponding to the signals received at antenna 201A, and a signal received at antenna 201C as depicted in FIG. 2A. In an embodiment, each of power sensors 203A-203C may be referred to as a combined power sensor.

According to the one or more embodiments as described herein, and as will be described in further detail below, each of phase shifters 204A, 204B, and 204C may have a plurality of different phase settings. In an embodiment, the phase settings may be a plurality of different phase offsets at a predetermined/selected phase interval. In an alternative embodiment, the plurality of different phase settings are three phase settings of 0, $\pi/2$, and $\pi$ (radians). As a result, each of power sensors 203A, 203B, and 203C may make a plurality (e.g., three) of combined power measurements for each unique pair of antennas in the manner described above and based on the plurality (e.g., three) of different phase settings. In an embodiment, the correlation module 214 may provide a signal to each of phase shifters 204A, 204B, and 204C to modify the phase settings of the phase shifters between the plurality of different values (e.g., 0, $\pi/2$, and $\pi$ (radians)). The signals from the correlation module 214 to the phase shifters 204A, 204B, and 204C are indicated in FIG. 2A with dashed arrows.

Although the example as depicted in FIG. 2A includes a phase shifter coupled to a particular antenna of each unique pair, it is expressly contemplated that the phase shifter may be coupled to the other antenna of each unique pair. For example, although phase shifter 204A is coupled to antenna 201B for the unique pair of antennas 201A and 201B, it is expressly contemplated that the phase shifter 204A can instead be coupled to antenna 201A for the unique pair of antennas 201A and 201B. As an even further example, consider the unique pair of antennas 201A and 201C. Instead of phase shifter 204C being coupled to antenna 201A, it is expressly contemplated that the phase shifter 204B, which is used for the unique pair of antennas 201B and 201C, may also be used for the unique pair of antennas 201A and 201C. Therefore, the output of the phase shifter 204B may be provided to both power sensors 203B and 203C.

As such, the configuration of the phase shifters as depicted in FIG. 2A is for illustrative purposes only, and it is expressly contemplated that the one or more embodiments as described herein may utilize any configuration such that the signals received at one antenna, of each unique pair of antennas, is shifted in phase and in amplitude.

In an embodiment, a transceiver 200 (e.g., transceiver 200A of FIG. 2A) according to the one or more embodiments as described herein requires a number of power sensors that is equal to $n+n(n-1)/2$, where n is the number of antennas of the multi-antenna array 106 (e.g., multi-antenna array 106A of FIGS. 2A).

For example, and as depicted in FIG. 2A, transceiver 200A includes three antennas. Therefore, transceiver 200A requires the use of six different power sensors, e.g., $3+3(3-1)/2$. Specifically, transceiver 200A includes three different power sensors (e.g., 202A, 202B, and 202C), one for each of antennas 201A, 201B, and 201C. Further, transceiver 200A includes three additional power sensors (e.g., 203A, 203B, and 203C), one for each unique pair of antennas. Therefore, transceiver 200A of FIG. 2A includes a total of six power sensors according to the one or more embodiments as described herein.

As a further example, a transceiver 200 that includes a multi-antenna array 106 with two antennas would require a total of three power sensors, e.g., $2+2(2-1)/2$. Specifically, a different power sensor would be required for each of the two antennas, and then a third power sensor would be required for the single unique pair of antennas. As an even further example, a transceiver 200 that includes a multi-antenna array 106 with six antennas would require a total of twenty-one power sensors, e.g., $6+6(6-1)/2$. Specifically, a different power sensor would be required for each of the six antennas. Additionally, a different power sensor would also be required for the fifteen unique pairs of antennas.

The multi-antenna array 106A of FIG. 2A including three antennas is for illustrative purposes only, and it is expressly contemplated that the one or more embodiments as described herein are applicable to a multi-antenna array 106 with any number of a plurality of antennas.

As depicted in FIG. 2A, the power measured from the six different power sensors of transceiver 200A are provided to correlation module 214. Correlation module 214 may implement the one or more embodiments as described herein. Specifically, and as will be described in further detail below with relation to the flow diagram of FIGS. 3A and 3B, correlation module 214 may use the power measurements obtained by the six different power sensors to estimate an auto-correlation matrix for the transceiver 200A with multi-antenna array 106A. For example, the correlation module 214 may utilize the power measurement from each of power sensors 202A-202C with the plurality (e.g., three) of different combined power measurements from power sensors 203A-203C to estimate an auto-correlation matrix for transceiver 200A with multi-antenna array 106A.

Figure 2B:
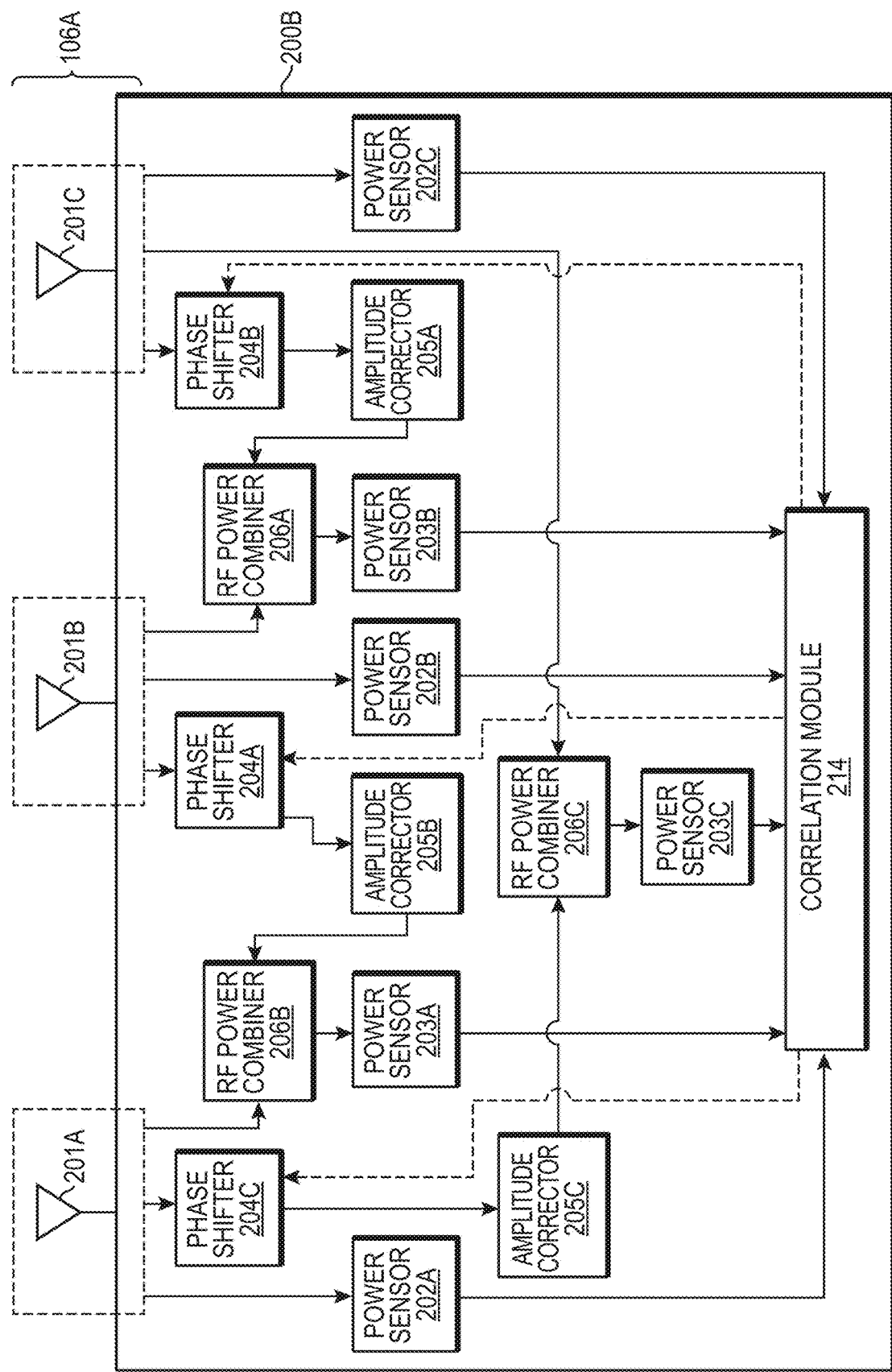
FIG. 2B is a different example transceiver with a multi-antenna array having three antennas, amplitude correctors, and RF power combiners for estimating an auto-correlation matrix according to the one or more embodiments as described herein.

FIG. 2B is a different example transceiver 200B with a multi-antenna array 106A having three antennas with amplitude correctors, and RF power combiners for estimating an auto-correlation matrix according to the one or more embodiments as described herein.

FIG. 2B is similar to FIG. 2A in that the transceiver 200B of FIG. 2B includes a different power sensor for each individual antenna and a different power sensor for each unique pair of antennas. However, the transceiver 200B also includes an amplitude corrector and a power combiner for each phase shifter. As explained above, each phase shifter (e.g., 204A-204C) can shift the signals that are received at a corresponding antenna in phase and in amplitude. To correct the amplitude, the shifted signal that is output from the phase shifter may be provided to an amplitude corrector that may correct the amplitude of the shifted signal to generate a corrected shifted signal. The corrected shifted signal may then be provided to an RF power combiner with a signal from the other antenna of the unique pair of antennas to generate a combined signal. The combined signal may then be provided to a power sensor to measure a power of the combined signal.

For example, and for unique pair of antennas 201A and 201B, the shifted signal from phase shifter 204A (corresponding to the signals received at antenna 201B) may be provided to amplitude corrector 205B. The amplitude corrector 205B may correct the amplitude of the shifted signal and generate a corrected shifted signal. The corrected shifted signal may be provided to the RF power combiner 206B that may combine the corrected shifted signal with the signal from antenna 201A to generate a combined signal. The combined signal may then be provided to power sensor 203A to measure the power of the combined signal and the measured combined power may be provided to the correlation module 214. The amplitude corrector 205A and RF power combiner 206A may operate in a similar manner for the unique pair of antennas 201B and 201C. Further, the amplitude corrector 205C and RF power combiner 206C may operate in a similar manner for the unique pair of antennas 201A and 201C.

As depicted in FIG. 2B, the power measured from the six different power sensors of transceiver 200B are provided to correlation module 214 that can estimate an auto-correlation matrix for the transceiver 200B with multi-antenna array 106A.

Figure 2C:
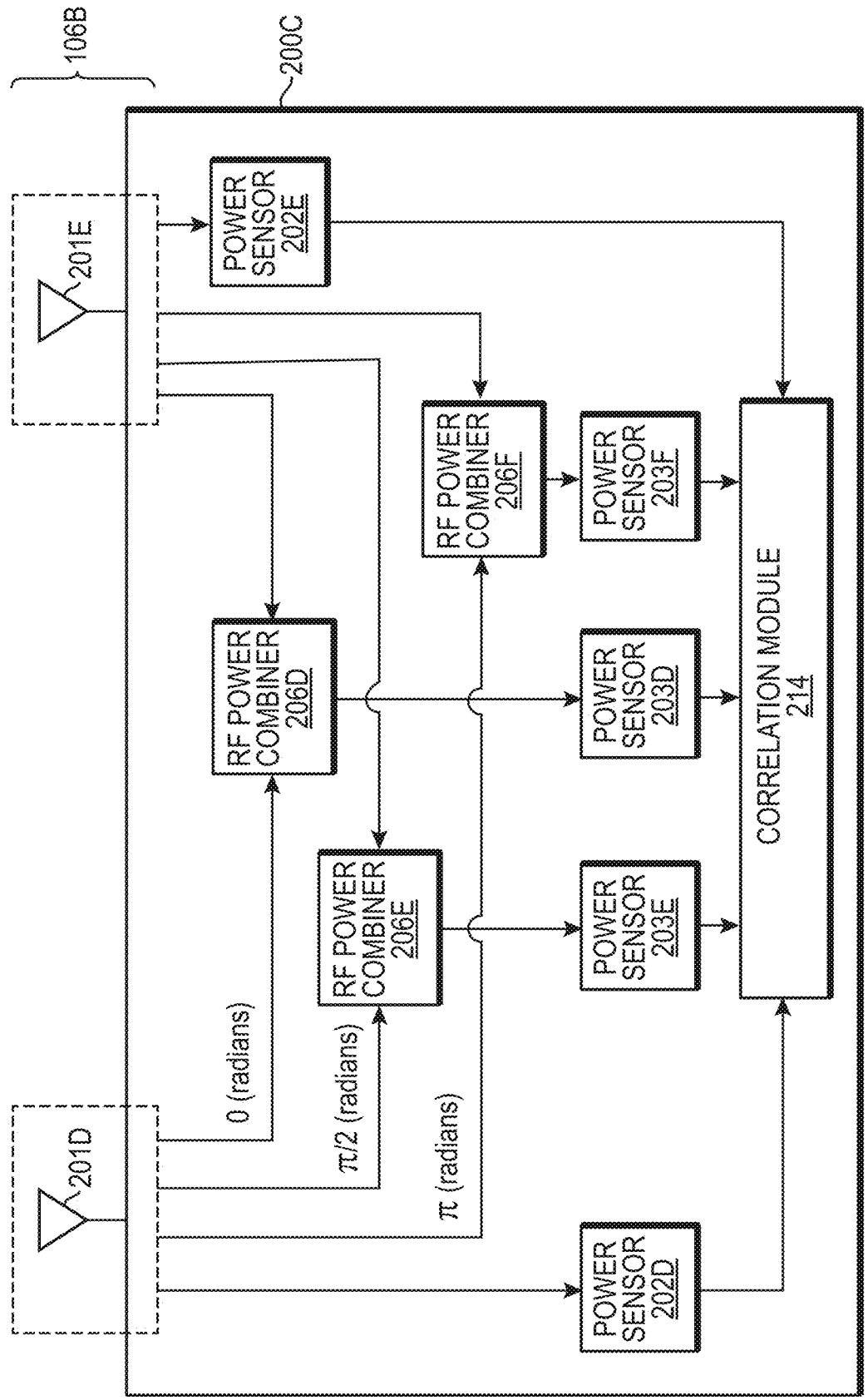
FIG. 2C is an even more different example transceiver, for estimating an auto-correlation matrix, including a multi-antenna array with two antennas and without phase shifters of FIGS. 2A and 2B and without amplitude correctors of FIG. 2B according to the one or more embodiments as described herein.

FIG. 2C is an even different example transceiver, for estimating an auto-correlation matrix, including a multi-antenna array with two antennas and without phase shifters of FIGS. 2A and 2B and without amplitude correctors of FIG. 2B according to the one or more embodiments as described herein. The transceiver 200C of FIG. 2C includes multi-antenna array 106B with two antennas 201D and 201E for simplicity and ease of understanding. However, it is expressly contemplated that the configuration of the transceiver 200C of FIG. 2C is applicable to a transceiver with a multi-antenna array that includes any other number of a plurality of antennas.

As depicted in FIG. 2C, power sensor 202D measures the power of the RF signals received at antenna 201D. Power sensor 202E measures the power of the RF signals received at antenna 201E. The measured powers can then be provided to correlation module 214.

As further depicted in FIG. 2C, the RF signals from one antenna of each unique pair of antennas is programmatically (e.g., simultaneously available in hardware) offset in phase (without a phase shifter), based on a phase setting of 0, π/2, and π (radians). Specifically, and as depicted in FIG. 2C for the unique pair of antennas 201D and 201E, the RF signals received at antenna 201D are offset in phase by 0, π/2, and π (radians) to generate three different shifted signals.

Each of the three different shifted signals may be provided to a different RF power combiner to combine the corresponding shifted signal with the signals received at antenna 201E. Specifically, RF power combiner 206D combines the shifted signals, corresponding to the signals received at antenna 201D with a phase offset of 0, with the RF signals received at antenna 201E to generate combined signals. RF power combiner 206E combines the shifted signals, corresponding to the signals received at antenna 201D with a phase offset of π/2, with the RF signals received at antenna 201E to generate combined signals. RF power combiner 206F combines the shifted signals, corresponding to the signals received at antenna 201D with a phase offset of π, with the RF signals received at antenna 201E to generate combined signals.

Each of the three combined signals may be provided to a different power sensor to generate three different combined power measurements for unique pair of antennas 201D and 201E. Specifically, power sensor 203D measures a power of the combined signal that is received from RF power combiner 206D and that is based on a phase offset of 0. Power sensor 203E measures a power of the combined signal that is received from RF power combiner 206E and that is based on a phase offset of π/2. Power sensor 203F measures a power of the combined signal that is received from RF power combiner 206F and that is based on a phase offset of π. The three different combined power measurements are then provided from power sensors 203D-203F to correlation module 214.

As will be described in further detail below, the correlation module 214 can estimate the auto-correlation matrix for transceiver 200C using the three combined power measurements and the power measurements for each antenna of multi-antenna array 106B. Therefore, and based on the configuration of transceiver 200C, a total of five power sensors and five power measurements are needed for the correlation module 214 to estimate the auto-correlation matrix for the transceiver 200C of FIG. 2C. As such, a transceiver according to the one or more embodiments as described herein that does not include a phase shifter may require a total of 3n+1 power sensors to estimate the auto-correlation matrix.

Figure 3A:
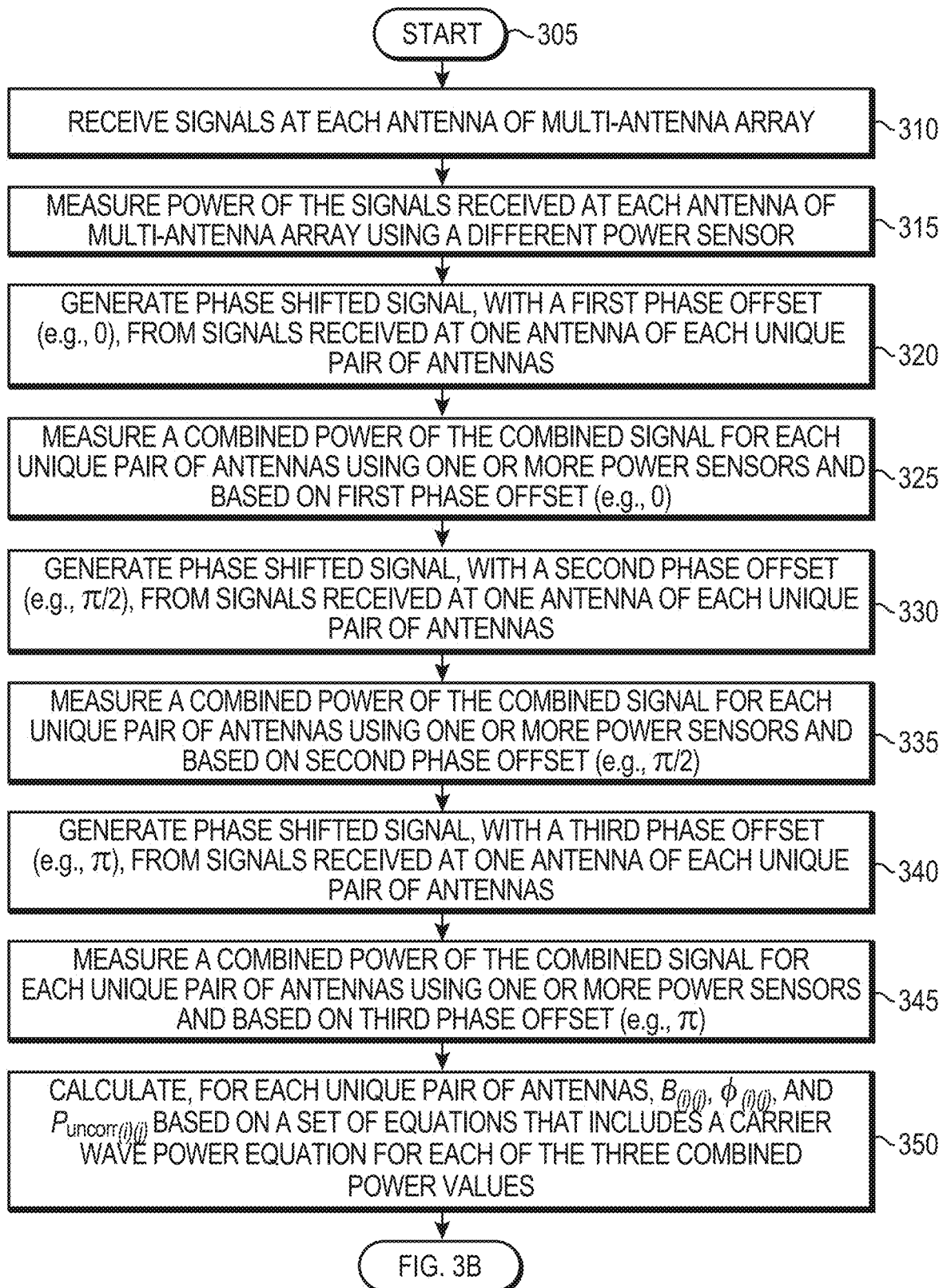
FIGS. 3A and 3B together constitute a flow diagram of a sequence of steps for estimating an auto-correlation matrix for a multi-antenna array using power measurements from a plurality of sensors according to the one or more embodiments as described herein.
Figure 3B:
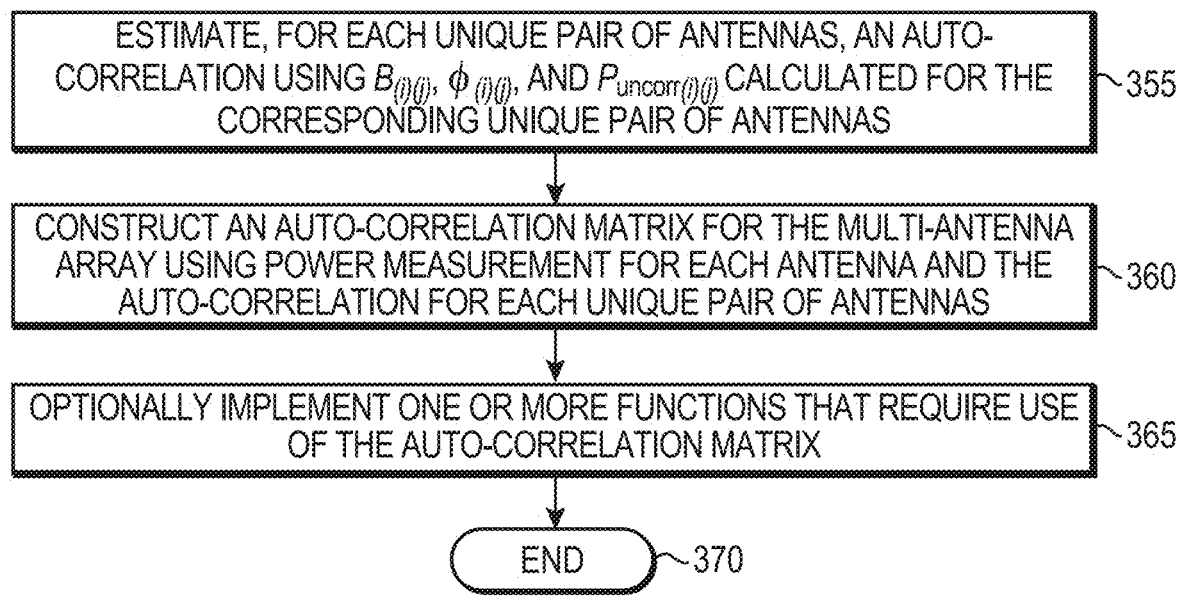

FIGS. 3A and 3B together constitute a flow diagram of a sequence of steps for estimating an auto-correlation matrix for a multi-antenna array using power measurements from a plurality of sensors according to the one or more embodiments as described herein. As illustrative examples, the flow diagram of FIGS. 3A and 3B may refer to the transceivers 200A and 200B and the multi-antenna array 106A of FIGS. 2A and 2B. However, it is expressly contemplated that the references to FIGS. 2A and 2B are for illustrative purposes only, and the flow diagram of FIGS. 3A and 3B are applicable to any antenna array system that requires the use of an auto-correlation matrix (e.g., transceiver 200C of FIG. 2C).

The description of FIGS. 3A and 3B include general formulas, for any unique pair of antennas, with a corresponding formula number. However, the formulas included in the description of FIGS. 3A and 3B that are related to the specific examples of FIGS. 2A and 2B do not include formula numbers.

The procedure starts at step 305 of FIG. 3A and continues to step 310. At step 310, each antenna of the multi-antenna array 106 receives signals. For example, and as depicted in FIGS. 2A and 2B, each of antennas 201A, 201B, and 201C may receive signals. In an embodiment, the signals may be RF signals received from transmitters/receivers 108. In an embodiment, the signals may be navigation signals in the RF domain that are received from one or more transmitters/receivers 108.

The procedure continues from step 310 to step 315. At step 315, a different power sensor (i.e., antenna assigned power sensor) measures the power of the signals received at a different antenna of the multi-antenna array 106.

For the example as depicted in FIGS. 2A and 2B, transceivers 200A and 200B include a separate and dedicated power sensor for each of antennas 201A, 201B, and 201C. Specifically, power sensor 202A measures the power of the signals received at antenna 201A. Further, power sensor 202B measures the power of the signals received at antenna 201B, while power sensor 202C measures the power of the signals received at antenna 201C.

For the examples of FIGS. 2A and 2B, let it be assumed that the power measured for each of antennas 201A, 201B, and 201C are as follows:

Power of signals received at antenna 201A=1;
Power of signals received at antenna 201B=2.0798; and
Power of signals received at antenna 201C=0.9806.

In an embodiment, the unit of measurement for each of the measured power values may be watts or milliwatts. The powers measured at power sensors 202A-202C may be provided to correlation module 214 as depicted in FIGS. 2A and 2B.

The procedure continues from step 315 to step 320. At step 320, a phase shifted signal, with a first phase offset, is generated from the signals received at one antenna of each unique pair of antennas. In an embodiment, the first phase offset is 0 (radians). In an embodiment, the generated phase shifted signal is shifted in phase and in amplitude based on the first offset, e.g., phase offset of 0. The use of "first" phase offset here, and the use of "second" phase offset and "third" phase offset later in the description are not meant to indicate a temporal relationship. Instead, first, second, and third are used herein to differentiate between the different phase offsets.

For the examples of FIGS. 2A and 2B, transceivers 200A and 200B include phase shifter 204A for the unique pair of antennas 201A and 201B. Phase shifter 204A may, based on a phase setting of 0, shift the signals that are received at antenna 201B in phase and in amplitude to generate shifted signals. Similarly, transceivers 200A and 200B may include phase shifter 204B for the unique pair of antennas 201B and 201C. Phase shifter 204B may, based on a phase setting of 0, shift the signals that are received at antenna 201C in phase and in amplitude to generate shifted signals. Transceivers 200A and 200B may also include phase shifter 204C for the unique pair of antennas 201A and 201C. Phase shifter 204C may, based on a phase setting of 0, shift the signals that are received at antenna 201A in phase and in amplitude to generate shifted signals.

Therefore, a different phase shifter (e.g., 204A, 204B, and 204C) is utilized for each unique pair of antennas to shift the signals received at one antenna of the unique pair based on a first phase setting, e.g., a phase setting of 0.

In an embodiment and for the example of FIG. 2C, the phase shifted signal with a phase offset of 0 may be generated programmatically for antenna 201D of unique pair of antennas 201D and 201E.

The procedure continues from step 320 to step 325. At step 325, each of one or more power sensors, for each unique pair of antennas, measures the combined power of the combined signal that is based on the first phase offset, e.g., 0.

For the example of FIG. 2A, transceiver 200A includes power sensor 203A, for unique pair of antennas 201A and 201B, that receives the signals from antenna 201A and receives the shifted signals from phase shifter 204A that may have a phase setting of 0 and that is coupled to antenna 201B. Power sensor 203A may measure the combined power of the received signals. Power sensor 203B of FIG. 2A may operate similarly for the unique pair of antennas 201B and 201C based on a phase setting of 0 for phase shifter 204B. Power sensor 203C of FIG. 2A may also operate similarly for the unique pair of antennas 201A and 201C based on a phase setting of 0 for phase shifter 204C.

In an embodiment, and as depicted in FIG. 2B, amplitude correctors and RF combiners may be utilized prior to a power sensor measuring the combined power for a unique pair of antennas. For example, as depicted in FIG. 2B, the shifted signal that is generated by phase shifter 204A for the unique pair of antennas 201A and 201B may be provided to amplitude corrector 205B. Amplitude corrector 205B may correct the amplitude of the shifted signal to generate a corrected shifted signal. The corrected shifted signal may then be provided to RF power combiner 206B that may combine the corrected shifted signal with the signal received at antenna 201A to generate a combined signal. The combined signal may then be provided to power sensor 203A that may measure a power of the combined signal for the unique pair of antennas 201A and 201B. Amplitude corrector 205A and RF power combiner 206A may operate similarly for unique pair of antennas 201B and 201C. Further, amplitude corrector 205C and RF power combiner 206C may operate similarly for unique pair of antennas 201A and 201C.

In an embodiment, and as depicted in FIG. 2C, RF power combiner 206D may be utilized, without an amplitude corrector, for unique pair of antennas 201D and 201E. Specifically, RF power combiner 206D may combine the programmatically shifted signals (based on a phase offset of 0) and the signals received at antenna 201E to generate combined signals. Power sensor 203D may measure the power of the combined signals based on a phase offset of 0.

The procedure continues from step 325 to step 330. At step 330, a phase shifted signal, with a second phase offset, is generated from the signals received at one antenna of the unique pair of antennas. In an embodiment, the second phase offset is $\pi/2$ (radians). In an embodiment, the generated phase shifted signal is shifted in phase and in amplitude based on the second offset, e.g., phase offset of $\pi/2$.

For the examples of FIGS. 2A and 2B, transceivers 200A and 200B include phase shifter 204A for the unique pair of antennas 201A and 201B. Phase shifter 204A may, based on a phase setting of $\pi/2$, shift the signals that are received at antenna 201B in phase and in amplitude to generate shifted signals. Phase shifter 204B may operate similarly for unique pair of antennas 201B and 201C using a phase setting of $\pi/2$. Further, phase shifter 204C may operate similarly for unique pair of antennas 201A and 201C using a phase setting of $\pi/2$.

In an embodiment and for the example of FIG. 2C, the phase shifted signal with a phase offset of $\pi/2$ may be generated programmatically for antenna 201D of unique pair of antennas 201D and 201E.

The procedure continues from step 330 to step 335. At step 335, each of one or more power sensors, for each unique pair of antennas, measures the combined power of the combined signal that is based on the second phase offset, e.g., $\pi/2$.

For the example of FIG. 2A, transceiver 200A includes power sensor 203A, for unique pair of antennas 201A and 201B, that receives the signal from antenna 201A and receives the shifted signal from phase shifter 204A that may have a phase setting of $\pi/2$ and that is coupled to antenna 201B. Power sensor 203A may measure the combined power of the received signals. Power sensor 203B may operate similarly for the unique pair of antennas 201B and 201C based on the phase setting of $\pi/2$ for phase shifter 204B, and power sensor 203C may operate similarly for the unique pair of antennas 201A and 201C based on the phase setting of $\pi/2$ for phase shifter 204C.

In an embodiment, and as depicted in FIG. 2B, amplitude correctors and RF combiners may be utilized prior to a power sensor measuring the combined power for a unique pair of antennas in a similar manner as described above with relation to step 325.

In an embodiment, and as depicted in FIG. 2C, RF combiner 206E may be utilized, without an amplitude corrector, for unique pair of antennas 201D and 201E. Specifically, RF combiner 206E may combine the programmatically shifted signals (based on a phase offset of $\pi/2$) with the RF signals received at antenna 201E to generate combined signals. The combined signals may be provided to power sensor 203E to measure a power of the combined signals based on the phase offset of $\pi/2$.

The procedure continues from step 335 to step 340. At step 340, a phase shifted signal, with a third phase offset, is generated from the signals received at one antenna of each unique pair of antennas. In an embodiment, the third phase offset is $\pi$ (radians). In an embodiment, the generated phase shifted signal is shifted in phase and in amplitude based on the third offset, e.g., phase offset of $\pi$.

For the examples of FIGS. 2A and 2B, transceivers 200A and 200B include phase shifter 204A for the unique pair of antennas 201A and 201B. Phase shifter 204A may, based on a phase setting of $\pi$, shift the signals that are received at antenna 201B in phase and in amplitude to generate shifted signals. Phase shifter 204B may operate similarly for unique pair of antennas 201B and 201C using a phase setting of $\pi$. Further, phase shifter 204C may operate similarly for unique pair of antennas 201A and 201C using a phase setting of IT.

In an embodiment and for the example of FIG. 2C, the phase shifted signal with a phase offset of $\pi$ may be generated programmatically for antenna 201D of unique pair of antennas 201D and 201E.

The procedure continues from step 340 to step 345. At step 345, each of one or more power sensors, for each unique pair of antennas, measures the combined power of the combined signal that is based on the third phase offset, e.g., $\pi$.

For the example of FIG. 2A, transceiver 200A includes power sensor 203A, for unique pair of antennas 201A and 201B, that receives the signal from antenna 201A and receives the shifted signal from phase shifter 204A that may have a phase setting of $\pi$ and that is coupled to antenna 201B. Power sensor 203A may measure the combined power of the received signals.

Power sensor 203B may operate similarly for the unique pair of antennas 201B and 201C based on the phase setting of π for phase shifter 204B, and power sensor 203C may operate similarly for the unique pair of antennas 201A and 201C based on the phase setting of π for phase shifter 204C.

In an embodiment, and as depicted in FIG. 2B, amplitude correctors and RF combiners may be utilized prior to a power sensor measuring the combined power for a unique pair of antennas in a similar manner as described above with relation to step 325.

In an embodiment, and as depicted in FIG. 2C, RF combiner 206F may be utilized, without an amplitude corrector, for unique pair of antennas 201D and 201E. Specifically, RF combiner 206F may combine the programmatically shifted signals (based on a phase offset of IT) with the RF signals received at antenna 201E to generate combined signals. The combined signals may be provided to power sensor 203F to measure a power of the combined signals based on the phase offset of π.

According to the examples as described in relation to FIGS. 2A and 2B, a total of six power sensors are utilized for the antenna array system that includes three antennas. Specifically, a different and dedicated power sensor is used for each antenna to measure a power of the signals received at that antenna. Therefore, and as described in relation to step 315, each of the three power sensors (e.g., 202A, 202B, and 202C) makes a power measurement such that three power measurements are obtained. Moreover, and as described in relation to steps 320 through 345, three different combined power measurements are made for each unique pair of antennas based on three different phase settings, e.g., 0, π/2, and π (radians). As a result, a total of nine combined power measurements are made for the antenna array system of FIGS. 2A and 2B that includes three antennas.

According to the example as described in relation to FIG. 2C, a total of five power sensors are utilized for the antenna array system that includes two antennas. Specifically, a different and dedicated power sensor is used for each antenna to measure a power of the signals received at that antenna. For example, and as described in relation to step 315 for FIG. 2C, a power measurement is made by power sensor 202D for the signals received at antenna 201D and a power measurement is made by power sensor 202E for the signals received at antenna 201E. Moreover, and as described in relation to steps 320 through 345, each of power sensors 203D, 203E, and 203F make a combined power measurement for unique pair of antennas 201D and 201E based on programmatically set phase settings of 0, π/2, and π. As a result, a total of three combined power measurements are made for the antenna array system of FIG. 2C that includes two antennas.

As will be described in further detail below, the three different combined power measurements for each unique pair of antennas can be used to calculate power correlations for the antennas of the corresponding unique pair. The calculated power correlation for each unique pair of antennas can then be used with the power measurements, for each individual antenna made at step 315, to construct the power correlation matrix as will be described in further detail below.

Referring back to FIG. 3A, the procedure continues from step 345 to step 350. Although steps 350 through 365 may refer to the example multi-antenna array 106A of FIGS. 2A and 2B that includes antennas 201A, 201B, and 201C, it is expressly contemplated that steps 350 through 365 are applicable to multi-antenna array 106B of FIG. 2C that includes antennas 201D and 201E and any other types of multi-antenna arrays. As such, the reference to multi-antenna array 106A of FIGS. 2A and 2B in relation to steps 350 through 365 is for illustrative purposes only.

At step 350, the correlation module 214 calculates $B_{(i)(j)}$, $\phi_{(i)(j)}$, and $P_{uncorr(i)(j)}$ for each unique pair of antennas of the multi-antenna array 106 using a set of equations that includes a carrier wave power equation for each of the three combined power values. Specifically, the correlation module 214 calculates $B_{(i)(j)}$, $\phi_{(i)(j)}$, and $P_{uncorr(i)(j)}$ for each unique pair of antennas by solving a system of power equations, wherein each power equation of the system corresponds to a different combined power measurement that is based on one of the selected phase offsets (e.g., 0, π/2, and π) as will be described in further detail below.

To illustratively describe how the one or more embodiments determine the system of equations to be solved, it is necessary to describe the relationship between antennas of a unique pair and the signals received at those antennas.

To that end, the relative correlated carrier signal entering each of two antennas (e.g., antenna i and antenna j) of a unique pair of antennas in the time domain may be represented as follows:

$$V_i(t) = \cos(\omega t) \tag{1}$$

$$V_j(t) = B * \cos(\omega t + \phi + \theta) \tag{2}$$

where
i represents an antenna (e.g., first antenna) of the unique pair of antennas;
j represents the other antenna (e.g., second antenna) of the unique pair of antennas;
$V_i$ is the voltage at the first antenna of a unique pair of antennas;
ω is the angular frequency;
t is time;
$V_j$ is the voltage at the second antenna, i.e., other antenna, of the unique pair of antennas;
B is a relative amplitude offset between the two paths to the antennas. This relative phase offset is typically due to phase differences between the two antennas;
φ is a relative phase offset between the two paths. This relative phase offset is typically due to the phase differences between the two antennas; and
θ is an adjustable phase value based on a phase offset corresponding to an antenna of the unique pair of antennas (e.g., the phase shift set for phase shifter 204C coupled to antenna 201A of unique pair of antennas 201A and 201C in FIGS. 2A and 2B).

For the illustrative example of FIGS. 2A and 2B, the relative correlated carrier signal entering each of the two antennas of unique pair of antennas 201A and 201B in the time domain may be represented as follows:

$$V_{201A}(t) = \cos(\omega t)$$

$$V_{201B}(t) = B * \cos(\omega t + \phi + \theta)$$

The relative correlation carrier signal may be similarly represented for the other unique pair of antennas (e.g., 201B/201C and 201A/201C) of multi-antenna array 106A.

The power, which corresponds to the two antennas of the unique pair, is proportional to the root-mean-square of the voltage signals as defined in formulas 1 and 2. Therefore, the power of the carrier wave signal travelling between two identical paths corresponding to the two antennas of the unique pair for the adjusted phase value (θ) can be written as:

$$P_{(i)(j)}(\theta) \propto \sqrt{(V_i(t) + V_j(t))^2} + P_{uncorr(i)(j)} \quad (3)$$

Wherein $P_{(i)(j)}(\theta)$ is the power (i.e., combined power) of the carrier wave signal travelling between two identical paths corresponding to the two antennas of the unique pair for the adjusted phase value; and $P_{uncorr(i)(j)}$ is the uncorrelated power between the two paths. The uncorrelated power between the two paths is typically due to multiple signal source envelopes entering the two antennas of the unique pair.

Using trigonometry, the three above formulas can be combined and rewritten as:

$$P_{(i)(j)}(\theta) \propto 0.5 B_{(i)(j)}^2 + B_{(i)(j)} \cos(\phi_{(i)(j)} + \theta) + 0.5 + P_{uncorr(i)(j)} \quad (4)$$

As can be seen above, formula 4 includes three unknowns of $B_{(i)(j)}$, $\phi_{(i)(j)}$, and $P_{uncorr(i)(j)}$. However, formula 4 is a non-linear equation. As such, any three power measurements, e.g., any three power measurements at three different phase settings, cannot always be used to solve for the three unknowns of formula 4. However, and according to the one or more embodiments as described herein, the power ($P_{(i)(j)}$) can be measured at three phase offsets (θ) of 0, π/2, and π to solve formula 4 for $B_{(i)(j)}$, $\phi_{(i)(j)}$, and $P_{uncorr(i)(j)}$. For example, and as explained above in relation to steps 325 through 345, phase shifters (e.g., 204A-204C) and power sensors (e.g., 203A-203C) are utilized to measure the combined power of each unique pair of antennas based on the particular phase offsets of (θ) of 0, π/2, and π. The combined power, for each unique pair of antennas, at the three selected offsets, can be written as:

$$P_{(i)(j)}(0) = 0.5 B_{(i)(j)}^2 + B_{(i)(j)} \cos(\phi_{(i)(j)}) + 0.5 + P_{uncorr(i)(j)} \quad (5)$$

$$P_{(i)(j)}(\pi) = 0.5 B_{(i)(j)}^2 - B_{(i)(j)} \cos(\phi_{(i)(j)}) + 0.5 + P_{uncorr(i)(j)} \quad (6)$$

$$P_{(i)(j)}(\pi/2) = 0.5 B_{(i)(j)}^2 - B_{(i)(j)} \sin(\phi_{(i)(j)}) + 0.5 + P_{uncorr(i)(j)} \quad (7)$$

Formulas 5, 6, and 7, can be re-arranged into an analytical solution to solve for the three unknowns ($P_{uncorr(i)(j)}$, $B_{(i)(j)}$, and $\phi_{(i)(j)}$) as:

$$P_{uncorr(i)(j)} = \frac{P_{(i)(j)}(0) - P_{(i)(j)}(\pi) - B_{(i)(j)}^2 - 1}{2} \quad (8)$$

$$B_{(i)(j)} = \frac{P_{(i)(j)}(0) - P_{(i)(j)}(\pi)}{2\cos(\phi_{(i)(j)})} \quad (9)$$

$$\phi_{(i)(j)} = \tan^{-1}\left(2\frac{P_{(i)(j)}(0) - P_{(i)(j)}(\pi/2)}{P_{(i)(j)}(0) - P_{(i)(j)}(\pi)} - 1\right) \quad (10)$$

For the illustrative example of FIGS. 2A and 2B, the analytical solution for solving the three unknowns for unique pair of antennas 201A and 20B may be:

$$P_{uncorr(201A)(201B)} = \frac{P_{(201A)(201B)}(0) - P_{(201A)(201B)}(\pi) - B_{(201A)(201B)}^2 - 1}{2}$$

$$B_{(201A)(201B)} = \frac{P_{(201A)(201B)}(0) - P_{(201A)(201B)}(\pi)}{2(\phi_{(201A)(201B)})}$$

$$\phi_{(201A)(201B)} = \tan^{-1}\left(2\frac{P_{(201A)(201B)}(0) - P_{(201A)(201B)}(\pi/2)}{P_{(201A)(201B)}(0) - P_{(201A)(201B)}(\pi)} - 1\right)$$

According to the one or more embodiments as described herein, the correlation module 214 can solve the system of equations that includes formulas 8, 9, and 10 to calculate $B_{(i)(j)}$, $\phi_{(i)(j)}$, and $P_{uncorr(i)(j)}$ for each unique pair of antennas of the multi-antenna array 106. For the examples of FIGS. 2A and 2B, the correlation module 214 calculates $B_{(201A)(201B)}$, $\phi_{(201A)(201B)}$, and $P_{uncorr(201A)(201B)}$ for the unique pair of antennas 204A and 204B using the formulas above that include the three combined power values that are measured at steps 325, 335, and 345 for the three selected angles of 0, π/2, and π (e.g., $P_{(201A)(201B)}(0)$, $P_{(201A)(201B)}(\pi/2)$, and $P_{(201A)(201B)}(\pi)$). Similarly, the correlation module 214 similarly calculates $B_{(201B)(201C)}$, $\phi_{(201B)(201C)}$, and $P_{uncorr(201B)(201C)}$ for the unique pair of antennas 204B and 204C. Further, the correlation module 214 similarly calculates $B_{(201A)(201C)}$, $\phi_{(201A)(201C)}$, and $P_{uncorr(201A)(201C)}$ for the unique pair of antennas 204A and 204C.

The procedure continues from step 350 of FIG. 3A to step 355 of FIG. 3B. At step 355, the correlation module 214 estimates an auto-correlation for each unique pair of antennas using $B_{(i)(j)}$, $\phi_{(i)(j)}$, and $P_{uncorr(i)(j)}$ that are calculated for the corresponding unique pair of antennas in step 350.

According to the one or more embodiments as described herein, it may be assumed that the co-variance is proportional to the power of the two signals combined (i.e., received) into a power sensor for the unique pair of antennas. Based on this assumption, the one or more embodiments as described herein may use the following equation to estimate the auto-correlation ($E[X_i X_j]$) between antennas of a unique pair of antennas of the multi-antenna array:

$$E[X_i X_j] \propto (P_{(i)(j)}(\theta_{Max(i)(j)}) - P_{(i)(j)}(\theta_{Min(i)(j)})) e^{j\theta_{Max(i)(j)}} \quad (11)$$

Where $P_{(i)(j)}(\theta_{Max(i)(j)})$ is the maximum power of the combined signals for the unique pair of antennas at a particular angle $\theta_{Max(i)(j)}$;

$P_{(i)(j)}(\theta_{Min(i)(j)})$ is the minimum power of the combined signals for the unique pair of antennas at a particular angle $\theta_{Min(i)(j)}$;

As explained above, the power for a unique pair of antennas can be represented by formula 4. As a result, $P_{(i)(j)}(\theta_{Max(i)(j)})$ and $P_{(i)(j)}(\theta_{Min(i)(j)})$ of formula 11 may be solved based on formula 4. Specifically, $P_{(i)(j)}(\theta_{Max(i)(j)})$ and $P_{(i)(j)}(\theta_{Min(i)(j)})$ may be calculated for each unique pair of antennas, based on formula 4, as follows:

$$P_{(i)(j)}(\theta_{Max(i)(j)}) \propto \quad (12)$$

$$0.5 B_{(i)(j)}^2 + B_{(i)(j)} \cos(\phi_{(i)(j)} + \theta_{Max(i)(j)}) + 0.5 + P_{uncorr(i)(j)}$$

-continued $$P_{(i)(j)}(\theta_{Min(i)(j)}) \propto \qquad (13)$$

$$0.5B_{(i)(j)}^2 + B_{(i)(j)}\cos(\phi_{(i)(j)} + \theta_{Min(i)(j)}) + 0.5 + P_{uncorr(i)(j)}$$

As explained above, $B_{(i)(j)}$, $\phi_{(i)(j)}$, and $P_{uncorr(i)(j)}$ of formulas 12 and 13 are calculated at step 350 for each unique pair of antennas using formulas 8, 9, and 10. Therefore, only $\theta_{Max(i)(j)}$ is undetermined in formula 12 for each unique pair of antennas to calculate $P_{(i)(j)}(\theta_{Max(i)(j)})$ for each unique pair of antennas. Similarly, only $\theta_{Min(i)(j)}$ is undetermined in formula 13 for each unique pair of antennas to calculate $P_{(i)(j)}(\theta_{Min(i)(j)})$ for each unique pair of antennas.

As shown, $\theta_{Max(i)(j)}$ and $\phi_{(i)(j)}$ are arguments for the cosine function of formula 12. All cosine functions are sinusoidal and range between −1 to 1. Therefore, the cosine function of formula 12 will have its largest value when $\cos(\phi_{(i)(j)} + \theta_{Max(i)(j)})=1$. Because $\cos(0)=1$, the correlation module 214 can determine that $P_{(i)(j)}(\theta_{Max(i)(j)})$ occurs when $\phi_{(i)(j)} + \theta_{Max(i)(j)}=0$, which means that $\cos(\phi_{(i)(j)} + \theta_{Max(i)(j)})$ of formula 12 will be a value of 1. Therefore, the correlation module 214 determines that $\theta_{Max(i)(j)}$ of formula 12 must be $-\phi_{(i)(j)}$ so that $\phi_{(i)(j)} + \theta_{Max(i)(j)}$ is equal to 0 in formula 12. This in turn results in $\cos(\phi_{(i)(j)} + \theta_{Max(i)(j)})$ equaling 1 in formula 12. As explained above, $\phi_{(i)(j)}$ is calculated for each unique pair of antennas at step 350. As such, the correlation module 214 determines that, for a unique pair of antennas, $\theta_{Max(i)(j)}$ in formula 12 must be $-\phi_{(i)(j)}$. This then allows the correlation module 214 to calculate $P_{(i)(j)}(\theta_{Max(i)(j)})$ for the unique pair of antennas using formula 12.

Because the cosine function is periodic, the correlation module 214 determines that $\theta_{Min(i)(j)}=\theta_{Max(i)(j)}\pm\pi$. As such, the correlation module 214 can determine $\theta_{Min(i)(j)}$ and then calculate $P_{(i)(j)}(\theta_{Min(i)(j)})$ for the unique pair of antennas using formula 13.

Therefore, and according to the one or more embodiments as described herein, the correlation module 214 determines $\theta_{Max(i)(j)}$ and $\theta_{Min(i)(j)}$ as described above and based on $\phi_{(i)(j)}$ that is calculated in step 350. That is, the correlation module 214 can determine $\theta_{Max(i)(j)}$ and $\theta_{Min(i)(j)}$ for formulas 12 and 13 based on determining $\phi_{(i)(j)}$ in step 350 and leveraging the characteristics of the cosine function as it relates to formulas 12 and 13.

Accordingly, the correlation module 214 can utilize $B_{(i)(j)}$, $\phi_{(i)(j)}$, $P_{uncorr(i)(j)}$, and $\theta_{Max(i)(j)}$ with formula 12 to calculate $P_{(i)(j)}(\theta_{Max(i)(j)})$ for each unique pair of antennas. Similarly, the correlation module 214 can utilize $B_{(i)(j)}$, $\phi_{(i)(j)}$, $P_{uncorr(i)(j)}$, and $\theta_{Min(i)(j)}$ with formula 13 to calculate $P_{(i)(j)}(\theta_{Min(i)(j)})$ for each unique pair of antennas.

In the illustrative example for antennas 201A and 201B of FIGS. 2A and 2B, the correlation module 214 can calculate $P_{(201A)(201B)}(\theta_{Max(201A)(201B)})$ and $P_{(201A)(201B)}(\theta_{Min(201A)(201B)})$ as follows:

$$P_{(201A)(201B)}(\theta_{Max(201A)(201B)}) \propto 0.5B_{(201A)(201B)}^2 +$$

$$B_{(201A)(201B)}\cos(\phi_{(201A)(201B)} + \theta_{Max(201A)(201B)}) + 0.5 + P_{uncorr(201A)(201B)}$$

$$P_{(201A)(201B)}(\theta_{Min(201A)(201B)}) \propto 0.5B_{(201A)(201B)}^2 +$$

$$B_{(201A)(201B)}\cos(\phi_{(201A)(201B)} + \theta_{Min(201A)(201B)}) + 0.5 + P_{uncorr(201A)(201B)},$$

using the values of $B_{(201A)(201B)}$, $\phi_{(201A)(201B)}$, $P_{uncorr(201A)(201B)}$, $\theta_{Max(201A)(201B)}$, and $\theta_{Min(201A)(201B)}$ that are determined for the unique pair of antennas 201A and 201B as described above. The correlation module 214 can similarly calculate $P_{(201B)(201C)}(\theta_{Max(201B)(201C)})$ and $P_{(201B)(201C)}(\theta_{Min(201B)(201C)})$ for unique pair of antennas 201B and 201C of multi-antenna array 106A. The correlation module 214 can similarly calculate $P_{(201A)(201C)}(\theta_{Max(201A)(201C)})$ and $P_{(201A)(201C)}(\theta_{Min(201A)(201C)})$ for unique pair of antennas 201A and 201C of multi-antenna array 106A.

Alternatively, the correlation module 214 may use a search technique, which herein may be referred to as a maximum and/or minimum search technique, to identify $P_{(i)(j)}(\theta_{Max(i)(j)})$ and $P_{(i)(j)}(\theta_{Min(i)(j)})$ for each unique pair of antennas. For example, consider antennas 201A and 201B of multi-antenna array 106A of FIG. 2A. Power sensor 203A may make a plurality of combined power measurements based on phase shifter 204A having a plurality of different phase offsets at a predetermined/selected phase interval. The correlation module 214 may compare all the combined power measurements to identify an extreme value (e.g. largest power value) and adding $\pm\pi$ radians to recover the phase of the other extreme value (e.g. smallest power value) due to the properties of sinusoids. The identified maximum and minimum are then $P_{(201A)(201B)}(\theta_{Max(201A)(201B)})$ and $P_{(201A)(201B)}(\theta_{Min(201A)(201B)})$, respectively. In addition or alternatively, the correlation module 214 may identify both the phase of the largest power value and the phase of the smallest power value using the maximum and minimum search technique as described herein. After adding $\pm\pi$ radians, the correlation module 214 may average the extreme values (e.g., the identified maximum and minimum values as described herein) to improve the estimate of the maximum and/or minimum. The correlation module 214 may perform a similar maximum and/or minimum search technique to identify $P_{(201B)(201C)}(\theta_{Max(201B)(201C)})$ and $P_{(201B)(201C)}(\theta_{Min(201B)(201C)})$ for unique pair of antennas 201B and 201C and $P_{(201A)(201C)}(\theta_{Max(201A)(201C)})$ and $P_{(201A)(201C)}(\theta_{Min(201A)(201C)})$ for unique pair of antennas 201A and 201C. For this alternative search approach, FIG. 3 may include additional steps after step 345 and before step 350 to generate additional shifted signals, based on additional phase offsets at the selected phase interval, and to perform corresponding combined power measurements.

Now that $P_{(i)(j)}(\theta_{Max(i)(j)})$ and $P_{(i)(j)}(\theta_{Min(i)(j)})$ are calculated for each unique pair of antennas, the correlation module 214 may estimate the auto-correlation for each unique pair of antennas (e.g., $E[X_iX_j]$) using equation 11.

Therefore, and in this example, the correlation module 214 may determine the auto-correlation for the unique pair of antennas 201A and 201B, e.g., $E[X_{201A}X_{201B}]$, using formula 11 with the values for $P_{(201A)(201B)}(\theta_{Max(201A)(210B)})$ and $P_{(201A)(201B)}(\theta_{Min(201A)(201B)})$ that are determined as described above for the unique pair of antennas 201A and 201B. Similarly, the correlation module 214 may determine the auto-correlation for the unique pair of antennas 201B and 201C, e.g., $[X_{201B}X_{201C}]$, using formula 11 with the values for $P_{(201B)(201C)}(\theta_{Max(201B)(201C)})$ and $P_{(201B)(201C)}(\theta_{Min(201B)(201C)})$ that are determined as described above for the unique pair of antennas 201B and 201C. The correlation module 214 may also determine the auto-correlation for the unique pair of antennas 201A and 201C, e.g., $[X_{201A}X_{201C}]$, using formula 11 with the values for $P_{(201A)(201C)}(\theta_{Max(201A)(201C)})$ and $P_{(201A)(201C)}(\theta_{Min(201A)(201C)})$ that are determined as described above for the unique pair of antennas 201A and 201C.

In an embodiment, the auto-correlation for each unique pair of antennas may be complex and include a real component (amplitude) and an imaginary component (phase). As an illustrative example, let it be assumed that the correlation module 214 determines that the unique pair of antennas for the multi-antenna array 106A of FIGS. 2A and 2B have the following auto-correlation values:

$$E[X_{201A}X_{201B}] = -0.7846 + 0.9350i$$
$$E[X_{201B}X_{201C}] = 1.0331 - 0.0971i$$
$$E[X_{201A}X_{201C}] = -0.3735 + 0.5910i$$

The procedure continues from step 355 to step 360 of FIG. 3B. At step 360, the correlation module 214 constructs an auto-correlation matrix for the multi-antenna array 106 using the power measurement for each antenna and the auto-correlation for each unique pair of antennas.

In an embodiment, the auto-correlation matrix is a square N×N matrix where N is the number of the plurality of antennas of the multi-antenna array 106. In the examples of FIGS. 2A and 2B, multi-antenna array 106A includes three antennas. Therefore, the auto-correlation matrix for the multi-antenna array 106A of FIGS. 2A and 2B is a 3×3 matrix.

In an embodiment, the auto-correlation matrix ($\hat{R}_{XX}$) for the multi-antenna array 106A of FIGS. 2A and 2B may be represented as:

$$\hat{R}_{XX} = \begin{bmatrix} R_{11} & R_{12} & R_{13} \\ R_{21} & R_{22} & R_{23} \\ R_{31} & R_{32} & R_{33} \end{bmatrix} = \begin{bmatrix} E[X_{201A}X_{201A}] & E[X_{201A}X_{201B}] & E[X_{201A}X_{201C}] \\ E[X_{201B}X_{201A}] & E[X_{201B}X_{201B}] & E[X_{201B}X_{201C}] \\ E[X_{201C}X_{201A}] & E[X_{201C}X_{201B}] & E[X_{201C}X_{201C}] \end{bmatrix}.$$

$R_{11}$ represents the auto-correlation of the first antenna (e.g., antenna 201A) with itself, $R_{12}$ represents the auto-correlation of the first antenna (e.g., antenna 201A) and the second antenna (e.g., antenna 201B), $R_{13}$ represents the auto-correlation of the first antenna (e.g., antenna 201A) and the third antenna (e.g., antenna 201C), and so forth.

As indicated above in formula 14, the correlation module 214 can construct a portion (e.g., top right triangle) of the auto-correlation matrix using the auto-correlation values (e.g., $E[X_{201A}X_{201B}]$, $E[X_{201B}X_{201C}]$, and $E[X_{201A}X_{201C}]$) that are calculated, e.g., estimated, for each unique pair of antennas as described above in relation to step 355.

Replacing the placeholders of the top right triangle with the corresponding auto-correlation values calculated in step 355 generates the following incomplete auto-correlation matrix for multi-antenna array 106A:

$$\begin{bmatrix} E[X_{201A}X_{201A}] & -0.7846 + 0.9350i & -0.3735 + 0.5910i \\ E[X_{201B}X_{201A}] & E[X_{201B}X_{201B}] & 1.0331 - 0.0971i \\ E[X_{201C}X_{201A}] & E[X_{201C}X_{201B}] & E[X_{201C}X_{201C}] \end{bmatrix}$$

The diagonal components of the auto-correlation matrix represent the correlation of the antenna with itself. As such, there is no complex component and the power measurements made for each antenna of the multi-antenna array 160 at step 315 can be used for the diagonal components. For example, the correlation module 214 may use the power measured for the signals received at antenna 201A for $E[X_{201A}X_{201A}]$ of the auto-correlation matrix. The correlation module 214 may use the power measured for the signals received at antenna 201B for $E[X_{201B}X_{201B}]$ of the auto-correlation matrix. The correlation module 214 may use the power measured for the signals received at antenna 201C for $E[X_{201C}X_{201C}]$ of the auto-correlation matrix.

Replacing the placeholders of the diagonal components with the example power values provided above in relation to step 315 generates the following incomplete auto-correlation matrix.

$$\begin{bmatrix} 1 & -0.7846 + 0.9350i & -0.3735 + 0.5910i \\ E[X_{201B}X_{201A}] & 2.0798 & 1.0331 - 0.0971i \\ E[X_{201C}X_{201A}] & E[X_{201C}X_{201B}] & 0.9806 \end{bmatrix}$$

According to the one or more embodiments as described herein, the auto-correlation matrix is Hermitian, meaning that $R_{(i)(j)} = R_{(j)(i)}^*$. Therefore, because the upper right triangle portion is determined as described above and based on the auto-correlation values calculated in relation to step 355, the correlation module 214 can determine the remaining lower left triangle of the auto-correlation matrix.

As such, the placeholders of the lower left triangle of the auto-correlation matrix may be replaced with corresponding values that are determined based on the auto-correlation values calculated in step 355 and the fact that the auto-correlation matrix is Hermitian. Accordingly, the correlation module 214 may construct the following auto-correlation matrix for multi-antenna array 106A:

(14)

$$\begin{bmatrix} 1 & -0.7846 + 0.9350i & -0.3735 + 0.5910i \\ -0.7846 - 0.9350i & 2.0798 & 1.0331 - 0.0971i \\ -0.3735 - 0.5910i & 1.0331 + 0.0971i & 0.9806 \end{bmatrix}$$

Therefore, the correlation module 214 can construct the auto-correlation matrix for antenna 106A based on the power measurements obtained in the RF domain from the six power sensors (e.g., 202A, 202B, 202C, 203A, 203B, and 203C). The example of the correlation module 214 constructing the auto-correlation matrix by first determining the upper right triangle, then the diagonal components, and lastly the lower left triangle is for ease of understanding and illustrative purposes only. It is expressly contemplated that the correlation module 214 may construct the auto-correlation matrix by determining the components of the matrix in any order or even in parallel.

The procedure then optionally continues from step 360 to step 365. At optional step 365, transceiver 200 may implement a function that requires the use of the auto-correlation matrix constructed in step 360. Such functions may include, but are not limited to, beamform steering, interference steering, identifying locations of signal sources, MUSIC, ESPRIT, TDOA, etc. The procedure then ends at step 370.

Figure 4:
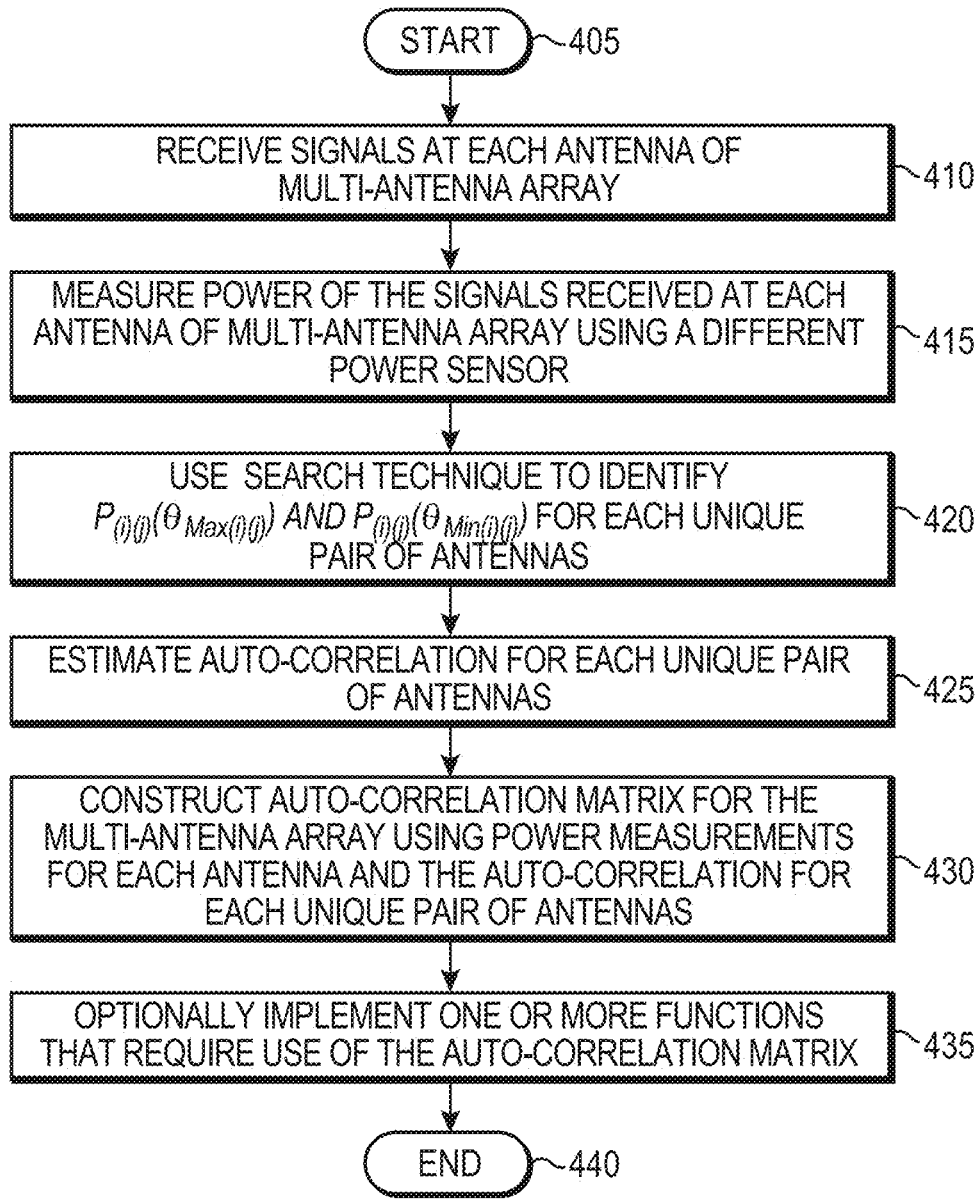
FIG. 4 is a flow diagram of a sequence of steps for estimating an auto-correlation matrix for a multi-antenna array using a search technique according to the one or more embodiments as described herein.

FIG. 4 is a flow diagram of a sequence of steps for estimating an auto-correlation matrix for a multi-antenna array using a search technique according to the one or more embodiments as described herein. The procedure of FIG. 4 starts at step 405 and continues to step 410. At step 410, each antenna of the multi-antenna array 106 receives signals. Each antenna may receive signals in a similar manner as described above in relation to step 310 of FIG. 3A.

The procedure continues to step 415. At step 415, a different power sensor (i.e., antenna assigned power sensor)

measures the power of the signals received at each antenna of the multi-antenna array 106. A different power sensor may measure the power of the signals in a similar manner as described above in relation to step 315 of FIG. 3A.

The procedure continues to step 420. At step 420, the correlation module 214 uses a search technique (e.g., maximum and/or minimum search technique) to identify $P_{(i)(j)}(\theta_{Max(i)(j)})$ and $P_{(i)(j)}(\theta_{Min(i)(j)})$ for each unique pair of antennas. The correlation module 214 may implement the search technique in the manner described above.

The procedure continues to step 425. At step 425, the correlation module 214 estimates an auto-correlation for each unique pair of antennas. The correlation module 214 may estimate the auto-correlation for each unique pair of antennas in a similar manner as described above in relation to step 355 of FIG. 3B.

The procedure continues to step 430. At step 430, the correlation module 214 constructs an auto-correlation matrix for the multi-antenna array 106 using the power measurement for each antenna and the auto-correlation for each unique pair of antennas. The correlation module 214 may construct the auto-correlation matrix in a similar manner as described above in relation to step 360 of FIG. 3B.

The procedure optionally continues to step 435. At optional step 435, transceiver 200 may implement a function that requires the use of the auto-correlation matrix constructed in step 430. Such functions may include, but are not limited to, beamform steering, interference steering, identifying locations of signal sources, MUSIC, ESPRIT, TDOA, etc. The procedure then ends at step 440.

In addition, the one or more embodiments as described herein can perform a power sensor calibration process prior to estimating the auto-correlation matrix as will be described in further detail below. As a result, the auto-correlation matrix, which is estimated utilizing power measurements that are calibrated as described herein, is accurate and reliable when used with different applications associated with phased-array antenna systems.

Figure 5A:
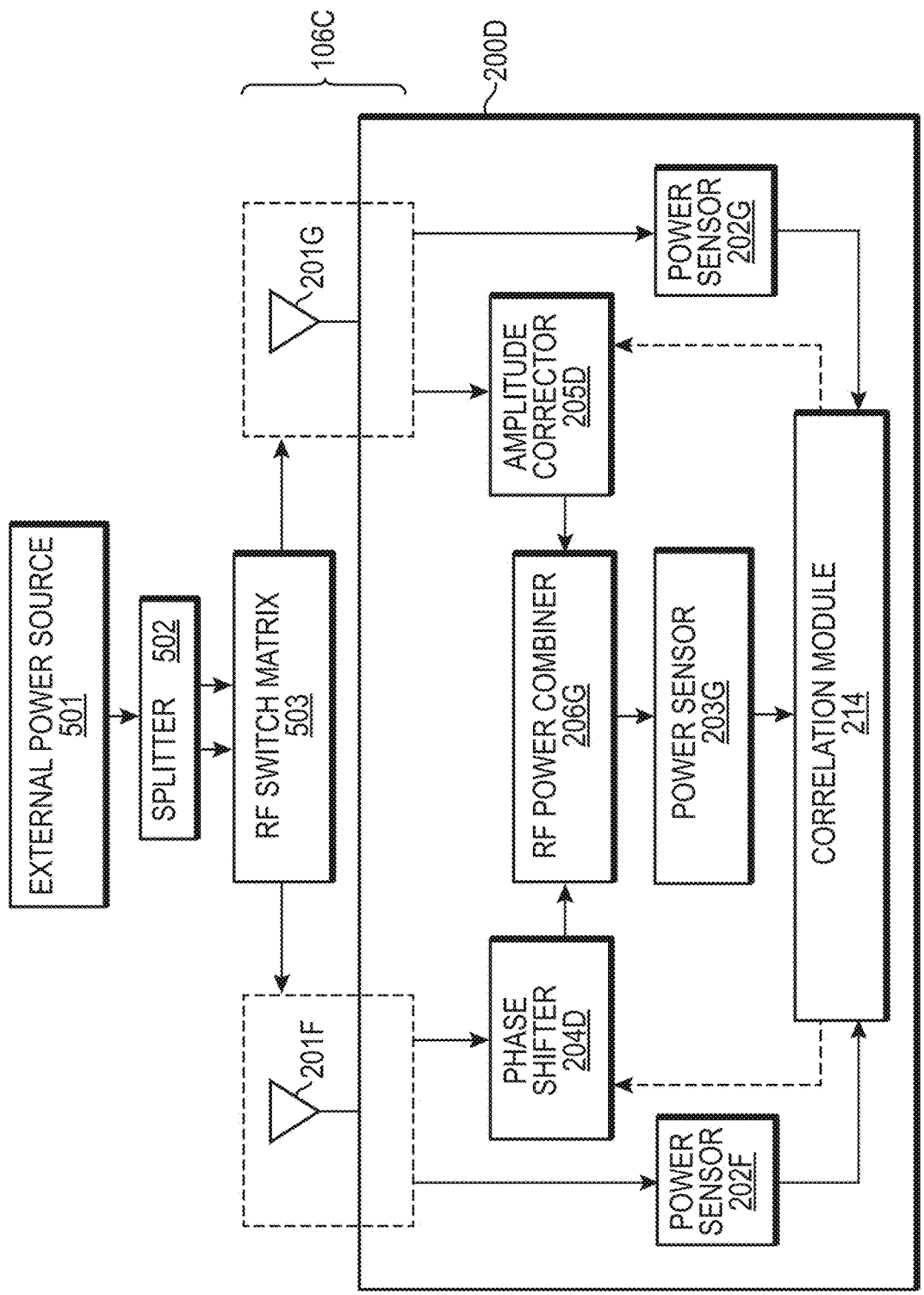
FIG. 5A is an example external power source coupled to a transceiver that includes a multi-antenna array with two antennas, amplitude correctors, and RF power combiners for implementing a power sensor calibration process and estimating an auto-correlation matrix according to the one or more embodiments as described herein.

FIG. 5A is an example external power source coupled to a transceiver that includes a multi-antenna array with two antennas, amplitude correctors, and RF power combiners for implementing a power sensor calibration process and estimating an auto-correlation matrix according to the one or more embodiments as described herein.

Transceiver 200D of FIG. 5A and its components may operate similarly to transceiver 200B and its components of FIG. 2B. However, transceiver 200D may implement a power sensor calibration process using RF signals generated by external power source 501 according to the one or more embodiments as described herein.

Different from transceiver 200B, amplitude corrector 205D and phase shifter 204D are on different paths to power sensor 203G that measures the combined powers for unique pair of antennas 201F and 201G. Although the amplitude corrector 205D and phase shifter 204D are on different paths in FIG. 5A, it is expressly contemplated that amplitude corrector 205D and phase shifter 204D may be on the same path to power sensor 203G.

Figure 5B:
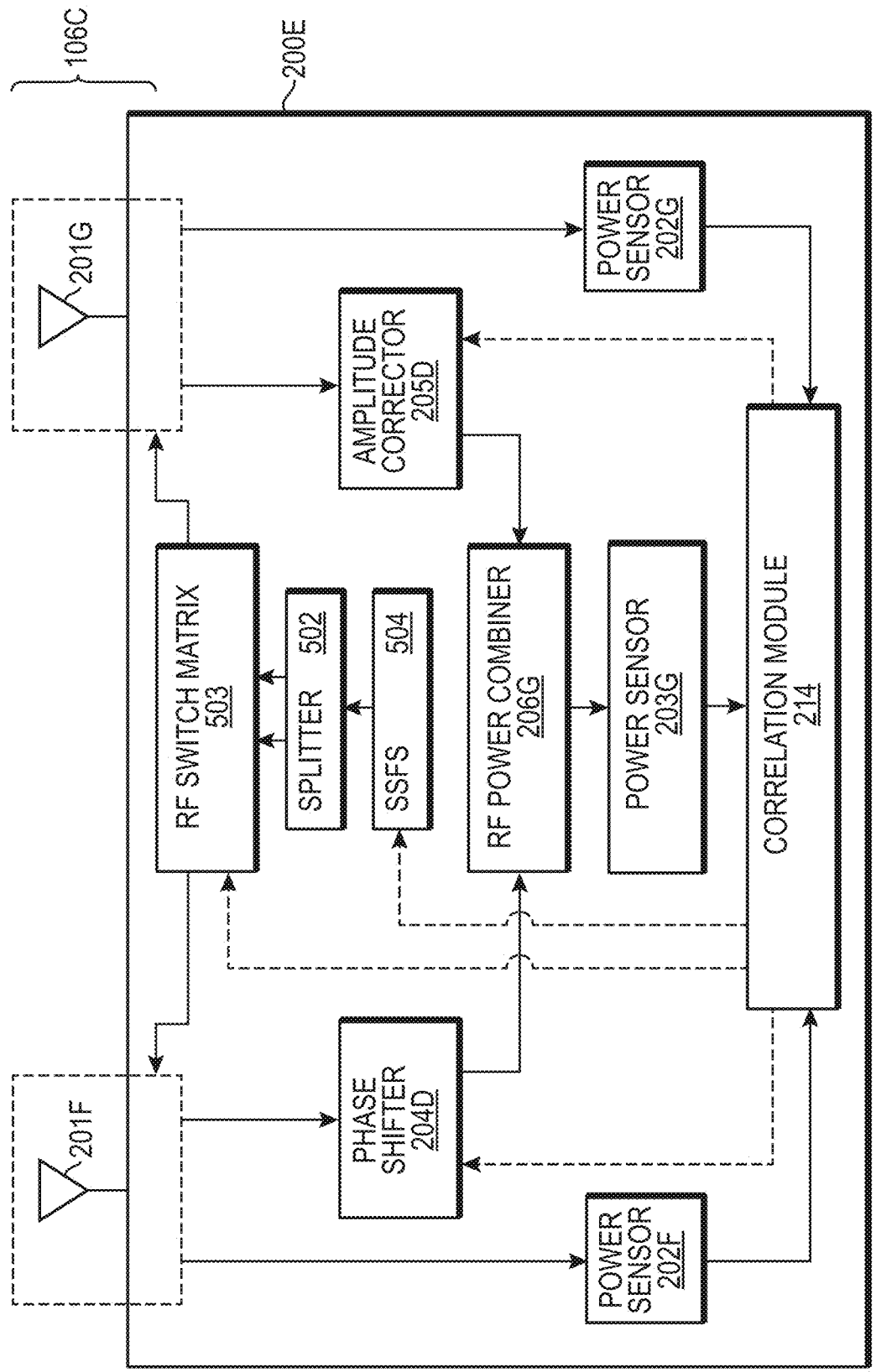
FIG. 5B is an example transceiver including an internal power source, a multi-antenna array with two antennas, amplitude correctors, and RF power combiners for implementing a power sensor calibration process and estimating an auto-correlation matrix according to the one or more embodiments as described herein.

Transceiver 200D of FIG. 5A is coupled to an external power source 501 via splitter 502 and RF switch matrix 503. The external power source 501 may generate a n RF signal that is provided to splitter 502 that splits the RF signal into a plurality (e.g., 2 as depicted in FIGS. 5A and 5B) separate RF signals. Splitter 502 may provide the separate RF signals to RF switch matrix 503 that can provide an RF signal to the port of antenna 201F and/or the port of antenna 201G. In an embodiment, external power source 501 may be preconfigured to generate an RF signal with a particular power. Alternatively, external power source 501 may be generate an RF signal with a particular power based on user input.

FIG. 5B is an example transceiver including an internal power source, a multi-antenna array with two antennas, amplitude correctors, and RF power combiners for implementing a power sensor calibration process and estimating an auto-correlation matrix according to the one or more embodiments as described herein.

Transceiver 200E of FIG. 5B may operate similarly to transceiver 200D of FIG. 5A. However, transceiver 200E of FIG. 5B is not coupled to an external power source. Instead, transceiver 200E of FIG. 5B includes an internal signal source frequency synthesizer (SSFS) that generates the RF signals. In an embodiment, the correlation module 215 may provide a signal to SSFS 504, as depicted with the dashed arrow in FIG. 5B, that causes SSFS 504 to generate an RF signal with a particular power. In an embodiment, correlation module 214 may provide a signal to RF switch matrix 503, as depicted with the dashed arrow in FIG. 5B, that causes RF switch matrix to send a generated RF signal to the antenna port of antenna 201F, to the antenna port of antenna 201G, or to the antenna ports of antennas 201F and 201G.

As will be described in further detail below, prior to estimating the auto-correlation matrix, the power measurements made by power sensors 202F, 202G, and 203G may be calibrated to account for the non-ideal factors as described herein.

Figure 6:
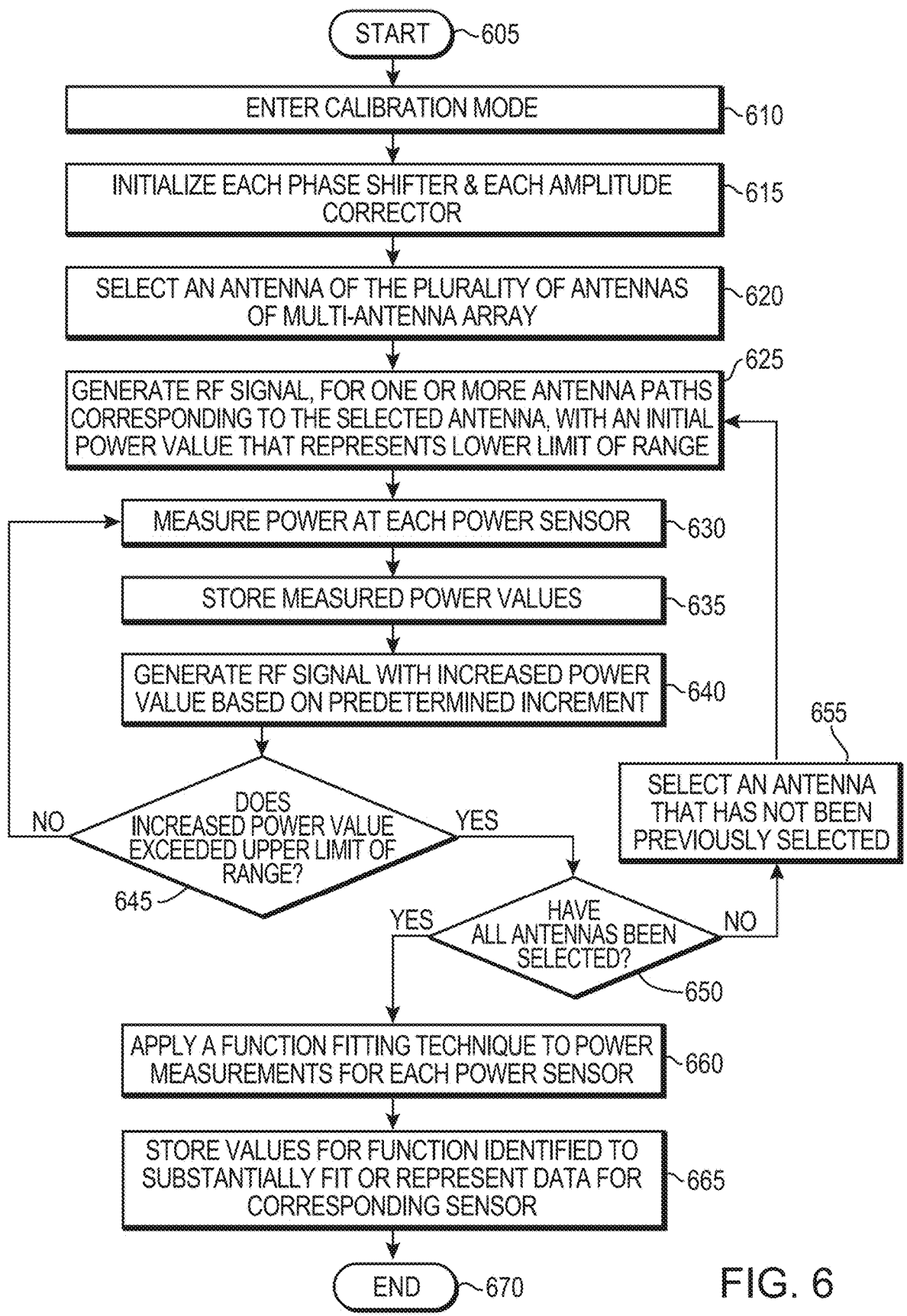
FIG. 6 is a flow diagram of a sequence of steps for implementing a power sensor sweep portion of a power sensor calibration process according to the one or more embodiments as described herein.

FIG. 6 is a flow diagram of a sequence of steps for implementing a power sensor sweep portion of a power sensor calibration process according to the one or more embodiments as described herein. Although the examples as described in relation to FIG. 6 may refer to transceivers 200B of FIG. 2B and transceivers 200D and 200E of FIGS. 5A and 5B, it is expressly contemplated that the flow diagram of FIG. 6 is applicable to transceivers that may be configured in a variety of different ways and with any number of different components (e.g., antennas, phase shifters, amplitude correctors, power combiners, etc.). As such, the reference to transceivers 200B, 200D, and 200E are for illustrative purposes only.

The procedure of FIG. 6 starts at step 605 and continues to step 610. At step 610, the transceiver, e.g., transceivers 200D and 200E, enter calibration mode. In an embodiment, transceivers 200D and 200E can operate in normal mode and in calibration mode. In normal mode, the ports of antennas 201F and 201G receive navigation signals to perform one or more navigation functions or related navigation functions. In calibration mode, the ports of antennas 201F and 201G may receive RF signals that are generated by external power source 501 of FIG. 5A or SSFS 504 of FIG. 5B such that the power sensor calibration process as described herein can be performed.

In an embodiment, transceivers 200D and 200E may enter calibration mode based on user input, on a predetermined schedule, etc. In an embodiment, correlation module 214 may determine that an application, which is associated with phased-array antenna systems, requires the use of an auto-correlation matrix. Based on this determination, the correlation module 214 may transition a transceiver from normal mode to calibration mode.

The procedure of FIG. 6 then continues to step 615. At step 615, the correlation module 214 initializes each phase shifter and each amplitude corrector of the transceiver. In an embodiment, correlation module 214 initializes each phase shifter to 0. For example, correlation module 214 may initialize phase shifter 204D to 0 degrees or 0 radians utilizing a signal as depicted in FIGS. 5A and 5B with a dashed arrow. Because transceivers 200D and 200E only include a single phase shifter, the correlation module 214 only initializes phase shifter 204D. However, if a transceiver includes a plurality of phase shifters, the correlation module 214 would initialize each of the plurality of phase shifters to 0. For example, the correlation module 214 would initialize each of phase shifters 204A, 204B, and 204C of FIG. 2B to 0.

In an embodiment, correlation module 214 initializes each amplitude corrector to 0 dB. For example, correlation module 214 may initialize amplitude corrector 205D to 0 dB utilizing a signal as depicted in FIGS. 5A and 5B with a dashed arrow. Because transceivers 200D and 200E only include a single amplitude corrector, the correlation module 214 only initializes amplitude corrector 205D. However, if a transceiver includes a plurality of amplitude correctors, the correlation module 214 would initialize each of the amplitude correctors to 0 dB. For example, the correlation module 214 would initialize each of amplitude correctors 205A, 205B, and 205C of FIG. 2B to 0 dB.

According to the one or more embodiments as described herein, phase shifter 204D and amplitude corrector 205D are kept at the initialized values during the power sensor sweep portion of FIG. 6.

The procedure of FIG. 6 continues from step 615 to step 620. At step 620, an antenna of a plurality of antennas of the multi-antenna array is selected. For the example of FIGS. 5A and 5B, let it be assumed that antenna 201F is selected from antennas 201F and 201G. As another example, let it be assumed that antenna 201A of FIG. 2B is selected from antennas 201A, 201B, and 201C.

The procedure of FIG. 6 continues from step 620 to step 625. At step 625, the RF signal is generated, with an initial power value that represents a lower limit of a range, for one or more antenna paths corresponding to the selected antenna. In an embodiment, the range may correspond to an operating range for a power sensor, e.g., power sensors 202F, 202G, and 203G of FIGS. 5A and 5B. In an embodiment, the range is from −110 dBm to 0 dBm, inclusive of the range values. Therefore, and in this example, the RF signal is generated with an initial power of −110 dBm.

In the example of FIGS. 5A and 5B, antenna 201F is selected. As such, the RF signal is generated with an initial power of −110 dBm for the two paths corresponding to antenna 201F as depicted in FIGS. 5A and 5B. In the example of FIG. 2B, antenna 201A is selected. As such, the RF signal is generated with an initial power of −110 dBm for the three paths corresponding to antenna 201A in FIG. 2B.

In an embodiment, the generated RF signal with the initial power of −110 dBm (e.g., generated by external source 501 or SSFS 504) is received by splitter 502 that splits the RF signal into a number of signals with equal power for each of antennas 201F and 201G in FIGS. 5A and 5B. Therefore, and for the example of FIGS. 5A and 5B, splitter 502 splits the generated RF signal into two split RF signals with equal power of −110 dBm. For the procedure of FIG. 6, the RF switch matrix 503 transmits one of the split RF signals with an initial power of −110 dBm to the port of antenna 201F, while preventing the other split RF signal from being transmitted to the port of antenna 201G. As such, the generated RF signal with an initial power of −110 dBm travels over the two paths corresponding to antenna 201F but does not travel over the two paths corresponding to antenna 201G.

For the example of FIG. 2B, the generated RF signal with an initial power of −110 dBm is provided via the antenna port corresponding to antenna 201A and travel over the three antenna paths corresponding to antenna 201A. However, the generated RF signal would not travel over the three paths corresponding to each of the other two antennas 201B and 201C.

Referring back to FIG. 6, the procedure continues from step 625 to step 630. At step 630, the power is measured at each power sensor of the transceiver. For the example of FIGS. 5A and 5B, power sensor 202F, 202G, and 203G each measure power based on the RF signal generated with an initial power of −110 dBm. Because antenna 201G does not receive the generated RF signal, the power measured at power sensor 202G is effectively zero due to noise. However, the power measured at power sensors 202F and 203G will be above a noise floor since antenna 201F, which receives the generated RF signal, includes a path to power sensor 202F and a path to power sensor 203G. In an embodiment, the noise floor is a value that may be preconfigured and/or user defined. In an embodiment, the noise floor is used to differentiate between noise and a legitimate signal.

There are non-ideal factors that negatively impact power sensors 202F and 203G to accurately measure power. For example, noise, the length of the path from the antenna to power sensor 202F, environmental conditions, etc. may negatively affect power sensor 202F to accurately measure power. The non-ideal factors that negatively impact power sensor 202F may similarly negatively impact power sensor 203G. Additionally, the phase shifter 204D and amplitude corrector 205D on the paths to power sensor 203G may also negatively impact power sensor 203G to accurately measure power. Therefore, the power measured at power sensors 202F and 203G will not be exactly −110 dBm. Instead, and as an example, the power measured at power sensor 202F may be −109 dBm, while the power measured at power sensor 203G may be −112 dBm.

For the example of FIG. 2, the power measured at power sensors 202A, 203A, and 203C will be above the noise floor since antenna 201A, which receives the generated RF signal with an initial value of −110 dBm, includes respective paths to power sensors 202A, 203A, and 203C. However, the power measured at the other power sensors of transceiver 200B will be effectively zero since antennas 201B and 201C do not receive the generated RF signal.

Referring back to FIG. 6, the procedure continues from step 630 to step 635. At step 635, the measured power values are stored. For example, the correlation module 214 may store the measured power values in internal storage (not shown) or external storage (not shown). In an embodiment, the correlation module 214 may store all measured power values (e.g., those that are above the noise floor and those that are not above the noise floor). In an alternative embodiment, the correlation module 214 may store only those measured power values that are above the noise floor. Therefore, and in this alternative embodiment, the correlation module would only store the power measured by power sensors 202F and 203G of FIGS. 5A and 5B. Similarly, for the example of FIG. 2B, the correlation module 214 would only store the power measured by power sensors 202A, 203A, and 203C.

The procedure of FIG. 6 continues from step 635 to step 640. At step 640, an RF signal is generated with an increased power value based on a predetermined increment. For this example, let it be assumed that the predetermined increment is 10 dB. Therefore, the external source 501 of FIG. 5A or SSFS of FIG. 5B generates an RF signal with an increased power value of −100 dBm (e.g., −110 dBm+10 dBm).

The procedure of FIG. 6 continues from step 640 to step 645. At step 645, correlation module 214 determines if the increased power value exceeds the upper limit of the range. For this example, the increased power value is −100 dBm and the upper limit of the range is 0 dBm. Because the increased power value does not exceed the upper limit of the range in this example, the procedure of FIG. 6 reverts back to step 630. At step 630, the power is again measured at each power sensor, based on the incremented power value of −100 dBm of the generated RF signal, and the power measurements are again stored at step 635.

Therefore, and in the example of FIGS. 5A and 5B, the power at power sensors 202F and 203G are measured and stored for each generated RF signal that is provided to antenna 201F and that has a different power value that starts at −110 dBm and ends at 0 dBm with 10 dBm increments. Specifically, at least the power at power sensor 202F and 203G are measured and stored when the generated RF signal, provided to the port of antenna 201F, has a power of −110 dBm, −100 dBm, −90 dBm, . . . 0 dBm. As such, twelve power measurements are measured and stored for each of power sensors 202F and 203G.

Referring back to step 645, when the increased power exceeds the upper limit of the range, the procedure continues from step 645 to step 650. For the example of FIGS. 5A and 5B, when the generated RF signal has a power that exceeds 0 dBm, which is the upper limit of the range, the procedure continues from step 645 to step 650. Stated another way, the procedure continues from step 645 to step 650 after the power at the power sensors are measured and stored when all the RF signals, with the different power values over the entire operating range, are provided to the port of the selected antenna.

At step 650, the correlation module 214 determines if all of the antennas have been selected. In the example as described herein in relation to FIGS. 5A and 5B, only antenna 201F of antennas 201F and 201G has been selected. As such, the procedure of FIG. 6 continues from step 650 to step 655. At step 655, an antenna that has not been previously selected is selected. Because antenna 201G has not been previously selected, antenna 201G is selected in step 655. The procedure then reverts back to step 625 such that the procedure repeats for the next selected antenna, which, in this example, is antenna 201G.

Therefore, the generated RF signals, with different power values over the range and based on the predetermined increment, are provided to the port of antenna 201G. The generated RF signals are not provided to the port of antenna 201F during this iteration. As such, at least the power of power sensors 202G and 203G are measured and stored for the RF signals generated with different power values over the range and based on the predetermined increment. For example, at least the power of power sensors 202G and 203G are measured and stored based on the RF signals that are provided to the port of antenna 201G and that have power values of −110 dBm, −100 dBm, −90 dBm, . . . 0 dBm.

Once all of the antennas of the transceiver are selected, the procedure continues from step 650 to step 660. For the example of FIGS. 5A and 5B, antennas 201F and 201G are sequentially (in any order) selected such that at least the power of the power sensors on the paths of the selected antenna can be measured and stored based on the provided RF signal that is generated with the different power values. For the example of FIG. 2B, antennas 201A, 201B, and 201C are sequentially (in any order) selected such that at least the power of the power sensors on the paths of the selected antenna can be measured and stored based on the provided RF signal that is generated with the different power level values.

At step 660, the correlation module 214 applies a function fitting technique to the power measurements stored for each power sensor. When all the power measurements are stored at step 635, only the power measurements that are above the noise floor are utilized in step 660.

Continuing with the example in relation to FIGS. 5A and 5B, there are twelve power measurements for power sensor 202F that are above the noise floor. Specifically, the twelve power measurements for power sensor 202F are above the noise floor when the RF signals that are generated with the different power level values are provided to the port of antenna 201F. When the RF signals that are generated with the different power level values are provided to the port of antenna 201G, the power measurements at power sensor 201F will be below the noise floor.

Each of the twelve power measurements for power sensor 202F has a corresponding input power value that is equal to the power value of the generated RF signal that is provided to the port of antenna 201F. As such, each power measurement and corresponding input power value together may represent a point in space (e.g., two-dimensional (2D) space). Therefore, the twelve power measurements and their corresponding input power values may represent a data set for power sensor 202F.

The correlation module 214 may apply a conventional function fitting technique that identifies a function that substantially fits or substantially represents the data set for a power sensor. In an embodiment, the function fitting technique is a polynomial function fitting technique (e.g., least squares, regression, etc.) that identifies a non-linear polynomial function that substantially fits or substantially represents the data set for the power sensor. In an embodiment, and when the identified function is a non-linear polynomial function, the non-linear polynomial function is a $3^{rd}$ order or higher polynomial function. Therefore, and in this example, correlation module 214 may apply a conventional polynomial fitting technique that identifies a non-linear polynomial function that fits the data set (e.g., twelve points) for power sensor 202F.

The procedure continues to step 665 and the correlation module 214 may store values for the function identified to substantially fit or substantially represent the data for the power sensor (e.g., power sensor 202F). For example, the values for the identified function may be stored in a similar manner as described above in relation to step 635. In an embodiment, and when the function is a polynomial function, the values are coefficients of the polynomial function. The procedure then ends at step 640.

The coefficients of the non-linear polynomial function identified to fit the data set for power sensor 202F may be used to calibrate/adjust the power measurements made by power sensor 202F. For this example, let it be assumed that a $3^{rd}$ order polynomial function is identified to fit the data set for power sensor 202F. The calibration of the power measurements made by power sensor 202F may be represented as:

$$P_{202F}^{Cal} = c_{(3)202F}(P_{202F}^{raw})^3 + c_{(2)202F}(P_{202F}^{raw})^2 + c_{(1)202F}(P_{202F}^{raw})^1 + c_{(0)202F},$$

wherein $P_{202}^{Cal}$ is the calibrated power measurement from power sensor 202F, $P_{202F}^{raw}$ is the power measured by power sensor 202F before calibration (e.g., raw measured power), $C_{(3)202F}$ is the cubic coefficient of the identified $3^{rd}$ order polynomial function identified for power sensor 202F, $C_{(2)202F}$ is the quadratic coefficient of the identified $3^{rd}$ order polynomial function identified for power sensor 202F, $C_{(1)202F}$ is the linear coefficient of the identified $3^{rd}$ order polynomial function identified for power sensor 202F, and $C_{(0)202F}$ is the constant (i.e., constant coefficient) of the identified $3^{rd}$ order polynomial function identified for power sensor 202F.

Similarly, the twelve power measurements for power sensor 202G are above the noise floor when the RF signals that are generated with the different power level values are provided to the port of antenna 201G. When the RF signals that are generated with the different power level values are provided to the port of antenna 201F, the power measurements at power sensor 202G will be below the noise floor. The correlation module 214 may apply a conventional polynomial fitting technique that identifies a non-linear polynomial function that fits the data set (e.g., twelve points) for power sensor 202G. For this example, let it be assumed that a $3^{rd}$ order polynomial function is identified to fit the data set for power sensor 202G. The calibration of the power measurements made by power sensor 202G may be represented as:

$$P_{202G}^{Cal} = c_{(3)202G}(P_{202G}^{raw})^3 + c_{(2)202G}(P_{202G}^{raw})^2 + c_{(1)202G}(P_{202G}^{raw})^1 + c_{(0)202G},$$

wherein $P_{202G}^{Cal}$ is the calibrated power measurement from power sensor 202G, $P_{202G}^{raw}$ is the power measured by power 202G before calibration (e.g., raw measured power), $C_{(3)202G}$ is the cubic coefficient of the identified $3^{rd}$ order polynomial function identified for power sensor 202G, $C_{(2)202G}$ is the quadratic coefficient of the identified $3^{rd}$ order polynomial function identified for power sensor 202G, $C_{(1)202G}$ is the linear coefficient of the identified $3^{rd}$ order polynomial function identified for power sensor 202G, and $C_{(0)202G}$ is the constant (i.e., constant coefficient) of the identified $3^{rd}$ order polynomial function identified for power sensor 202G.

For power sensor 203G there are two different and distinct data sets. One data set includes twelve power measurements based on the generated RF signals that are provided to the port of antenna 201F and reach power sensor 203G via the corresponding path. The other data set includes twelve power measurements based on the generated RF signals that are provided to the port of antenna 201G and reach power sensor 203G via the corresponding path. The calibration of the power measurements made by power sensor 203G, based on the generated RF signals received at antenna 201F, may be represented as:

$$P_{203G(201F)}^{Cal} = c_{(3)203G(201F)}\left(P_{203G(201F)}^{raw}\right)^3 + c_{(2)203G(201F)}\left(P_{203G(201F)}^{raw}\right)^2 + c_{(1)203G(201F)}\left(P_{203G(201F)}^{raw}\right)^1 + c_{(0)203G(201F)},$$

wherein $P_{203G(201F)}^{Cal}$ is the calibrated power measurement from power sensor 203G based on a signal received at antenna 201F, $P_{203G(201F)}^{raw}$ is the power measured by power 203G based on the signal received at antenna 201F and before calibration (e.g., raw measured power), $C_{(3)203G(201F)}$ is the cubic coefficient of the identified $3^{rd}$ order polynomial function identified for power sensor 203G and based on the generated RF signals received at antenna 201F, $C_{(2)203G(201F)}$ is the quadratic coefficient of the identified $3^{rd}$ order polynomial function identified for power sensor 203G and based on the generated RF signals received at antenna 201F, $C_{(1)203G(201F)}$ is the linear coefficient of the identified $3^{rd}$ order polynomial function identified for power sensor 203G and based on the generated RF signals received at antenna 201F, and $C_{(0)203G(201F)}$ is the constant (i.e., constant coefficient) of the identified $3^{rd}$ order polynomial function identified for power sensor 203G and based on the generated RF signals received at antenna 201F.

The calibration of the power measurements made by power sensor 203G, based on the generated RF signals received at antenna 201G, may be represented as:

$$P_{203G(201G)}^{Cal} = c_{(3)203G(201G)}\left(P_{203G(201G)}^{raw}\right)^3 + c_{(2)203G(201G)}\left(P_{203G(201G)}^{raw}\right)^2 + c_{(1)203G(201G)}\left(P_{203G(201G)}^{raw}\right)^1 + c_{(0)203G(201G)}.$$

wherein $P_{203G(201G)}^{Cal}$ is the calibrated power measurement from power sensor 203G based on a signal received at antenna 201G, $P_{203G(201G)}^{raw}$ is the power measured by power 203G based on the signal received at antenna 201G and before calibration (e.g., raw measured power), $C_{(3)203G(201G)}$ is the cubic coefficient of the identified $3^{rd}$ order polynomial function identified for power sensor 203G and based on the generated RF signals received at antenna 201G, $C_{(2)203G(201G)}$ is the quadratic coefficient of the identified $3^{rd}$ order polynomial function identified for power sensor 203G and based on the generated RF signals received at antenna 201G, $C_{(1)203G(201G)}$ is the linear coefficient of the identified $3^{rd}$ order polynomial function identified for power sensor 203G and based on the generated RF signals received at antenna 201G, and $C_{(0)203G(201G)}$ is the constant (i.e., constant coefficient) of the identified $3^{rd}$ order polynomial function identified for power sensor 203G and based on the generated RF signals received at antenna 201G.

The power measurements calibrated based on the power sensor sweep as described in relation to the flow diagram of FIG. 6 may be referred to as coefficient calibrated power measurements.

Power sensor 202F is an antenna assigned power sensor and there are no other components between antenna 201F and power sensor 202F. Similarly, power sensor 202G is an antenna assigned power sensor and there are no other components between antenna 201G and power sensor 202G. As such, $P_{202F}^{Cal}$ and $P_{202G}^{Cal}$ are the calibrated power measurements (i.e., coefficient calibrated power measurements) for power sensors 202F and 202G and may be used when estimating the auto-correlation matrix as described herein. Similarly, in relation to FIG. 2B, power sensors 202A, 202B, and 202C are antenna assigned power sensors and there are no other components along their paths from their respective antennas. As such, the power measurements calibrated based on the coefficients of the identified polynomial functions, i.e., coefficient calibrated power measurements, are the calibrated power measurements for power sensors 202A, 202B, and 202C and can be used when estimating the auto-correlation matrix as described herein.

The coefficient calibrated power measurements from power sensors 202F and 202G (antenna assigned power sensors) of FIGS. 5A and 5B exhibit linearity over their operating ranges. Therefore, the coefficient calibrated power measurements from power sensors 202F and 202G are directly proportional to the actual power of the generated RF signals that are provided as input. This means that the coefficient calibrated power measurements from power sensors 202F and 202G are reliable and consistent across their operating ranges. This is true for the coefficient calibrated power measurements of power sensors 202A, 202B, and 202C (antenna assigned power sensors) of FIG. 2B of FIG. 2, which is the other example described in relation to FIG. 6.

Therefore, the one or more embodiments as described herein provide an efficient technique for calibrating power measurements from antenna assigned power sensors of a transceiver such that the calibrated power measurements, i.e., coefficient calibrated power measurements, can be utilized for any of a variety of different functions that require the use of calibrated power measurements. As such, the one or more embodiments as described herein provide an improvement in the existing technological field of power sensor calibration.

Different than antenna assigned power sensors, power sensor 203G of FIGS. 5A and 5B is a combination of power sensor and other components (e.g., phase shifter 204D and amplitude corrector 205D) located on the paths to power sensor 203G. Therefore, the coefficient calibrated power measurements from FIG. 6 for power sensor 203G will not exhibit the desired linearity. Stated a different way, the other components on the path to power sensor 203G are non-ideal factors which need to be accounted for to adjust the coefficient calibrated power measurements from power sensor 203G such that the desired relative accuracy and linearity between sensors is achieved.

As such, the phase shifter insertion loss portion and the phase and amplitude adjustment portion of the power sensor calibration process are performed for power sensor 203G as will be described in further detail below in relation to FIGS. 7, 8A, and 8B. Similarly, and in relation to FIG. 2B, power sensors 203A, 203B, and 203C are combined power sensors. As such, the phase shifter insertion loss portion and the phase and amplitude adjustment portion of the power sensor calibration process are performed for power sensors 203A, 203B, and 203C as will be described in further detail below in relation to FIGS. 7, 8A, and 8B.

Figure 7:
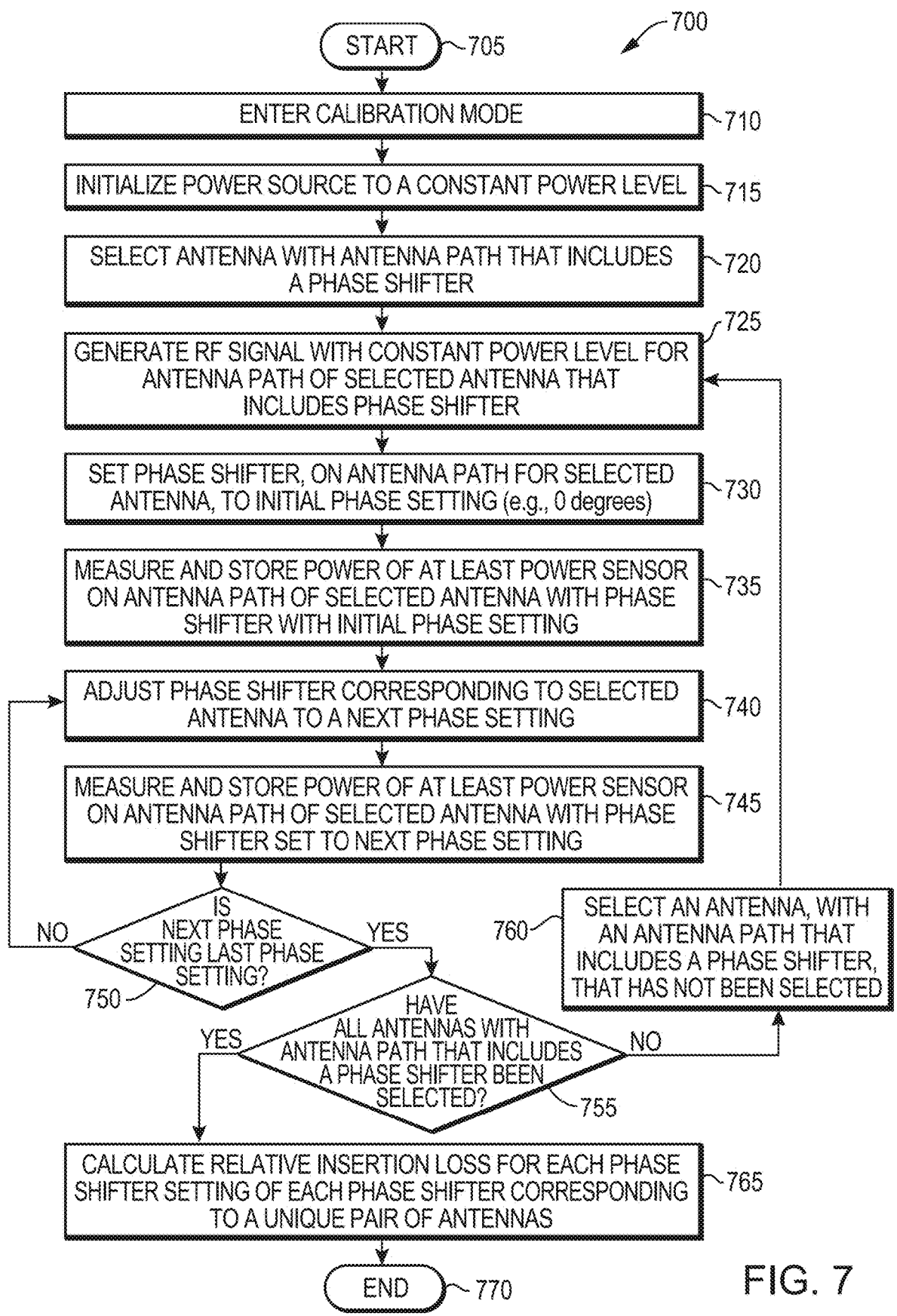
FIG. 7 is a flow diagram of a sequence of steps for implementing a phase shifter insertion loss portion of the power sensor calibration process according to the one or more embodiments as described herein.

FIG. 7 is a flow diagram of a sequence of steps for implementing a phase shifter insertion loss portion of the power sensor calibration process according to the one or more embodiments as described herein. As will be described in further detail below in relation to FIG. 7, power measurements which are calibrated based on the coefficients determined from FIG. 6 (i.e., coefficient calibrated power measurements) can be used to determine a relative insertion loss for each phase shifter at each of a plurality of different phase settings.

For example, and as will be described in further detail below in relation to FIG. 7, coefficient calibrated power measurements from power sensor 203G of FIGS. 5A and 5B can be used to determine the relative insertion loss of phase shifter 204D at each of a plurality of different phase settings. As another example, consider phase shifters 204A, 204B, and 204C of FIG. 2B. As will be described in further detail below in relation to FIG. 7, coefficient calibrated power measurements from power sensor 203C can be used to determine the relative insertion loss of phase shifter 204C at each of the plurality of different phase settings. Similarly, coefficient calibrated power measurements from power sensor 203A can be used to determine the relative insertion loss of phase shifter 204A at each of the plurality of different phase settings. Further, coefficient calibrated power measurements from power sensor 203B can be used to determine the relative insertion loss of phase shifter 204B at each of the plurality of different phase settings.

The procedure of FIG. 7 starts at step 705 and continues to step 710. At step 710, the transceiver, e.g., transceivers 200D and 200E, enters calibration mode. The transceiver may enter calibration mode in a similar manner as described above in relation to step 610 of FIG. 6. The procedure of FIG. 7 continues from step 710 to step 715. At step 715, the power source is initialized to a constant power level. For example, external power source 501 of FIG. 5A or SSFS of FIG. 5B is set to a constant power level. In an embodiment, the constant power level is a constant nominal power level that is above the noise floor that, for example, may be predefined.

The procedure of FIG. 7 continues from step 715 to step 720. At step 720, an antenna with a path that includes a phase shifter is selected. For the example of FIGS. 5A and 5B, only antenna 201F includes a path with a phase shifter. Specifically, antenna 201F includes an antenna path with phase shifter 204D to power sensor 203G. As such, antenna 201F is selected at step 720. For the example of FIG. 2B, antennas 201A, 201B, and 201C each include a path with a phase shifter. As such, one of antennas 201A, 201B, and 201C is selected at step 720. For the example of FIG. 2B, let it be assumed that antenna 201A is selected from antennas 201A, 201B, and 201C.

The procedure of FIG. 7 continues from step 720 to step 725. At step 725, the RF signal is generated with a constant power level for an antenna path of the selected antenna that includes the phase shifter. In an embodiment, the RF signal is generated with a constant power level and provided to the selected antenna in a similar manner as described above in relation to step 625 of FIG. 6.

For the example of FIGS. 5A and 5B, the generated RF signal with the constant power level is provided to antenna 201F that has a path to power sensor 203G with phase shifter 204D. For the example of FIG. 2B, the generated RF signal with the constant power level is provided to antenna 201A that has a path to power sensor 203C with phase shifter 204C.

The procedure of FIG. 7 continues from step 725 to step 730. At step 730, the phase shifter on the antenna path of the selected antenna is set to an initial value. For the example of FIGS. 5A and 5B, phase shifter 204D is set to the initial value. For the example of FIG. 2B, phase shifter 204C is set to the initial value. In an embodiment, the initial value is 0 degrees or 0 radians. In an embodiment, the initial value (i.e., initial phase setting value) is the same as the initialized phase setting value in step 615 of FIG. 6.

In an embodiment, the initial phase value is a lowest phase value of a plurality of different phase values (i.e., a plurality of different phase offsets). For example, and when the auto-correlation matrix is estimated based on the flow diagram of FIGS. 3A and 3B, the plurality of different phase values are 0, $\pi/2$, and $\pi$, wherein the initial value is 0 radians. When the auto-correlation matrix is estimated based on the flow diagram of FIG. 4, the plurality of different phase values may correspond to the phase offsets and predetermined phase interval used in the search technique of FIG. 4. For example, the plurality of different phase values may span a range from 0 degrees to 360 degrees with 15 degree increments, wherein 0 degrees is the initial value.

The procedure of FIG. 7 continues from step 730 to step 735. At step 735, the power of at least the power sensor, on the antenna path of the selected antenna with the phase shifter that is set to the initial value, is measured and stored. Specifically, the coefficient calibrated power measurement is obtained from the at least one power sensor on the antenna path of the selected antenna with the phase shifter that is set to the initial value.

In an embodiment, all powers of the power sensors of the transceiver are measured and stored based on the initial phase setting at step 735. In an alternative embodiment, all power sensors of the transceiver are measured and only those power measurement values that are above the noise floor are stored at step 735. In an even further embodiment, only the power measurements of the power sensor on the antenna path of the selected antenna with the phase shifter are measured and stored at step 735.

For the example of FIGS. 5A and 5B, phase shifter 204D is set to the initial value of 0 by the correlation module 214 as indicated by the dashed arrows in FIGS. 5A and 5B. Based on setting the phase shifter 204D to 0, the power measurement for at least power sensor 203G is measured and stored, wherein the power measurement is calibrated using the coefficients of the polynomial function identified for power sensor 203G in FIG. 6. That is, the coefficient calibrated power measurement of power sensor 203G is obtained based on phase shifter 204D being set to the initial value of 0.

For the example of FIG. 2B, phase shifter 204C is set to the initial value of 0. Based on setting the phase shifter 204C to 0, the power measurement for at least power sensor 203C is measured and stored, wherein the power measurement is calibrated using the coefficients of the polynomial function identified for power sensor 203C in FIG. 6. That is, the coefficient calibrated power measurement of power sensor 203C is obtained based on phase shifter 204C being set to the initial value of 0.

In an embodiment, the coefficient calibrated power measurements that are measured based on the initial phase value may be stored in internal storage (not shown) or external storage (not shown).

The procedure of FIG. 7 continues from step 735 to step 740. At step 740, the phase shifter corresponding to the selected antenna is adjusted to a next phase setting. For the example of FIGS. 5A and 5B, phase shifter 204D is adjusted to the next phase setting. For the example of FIG. 2B, phase shifter 204C is adjusted to the next phase setting. When the plurality of different phase values include 0, π/2, and π, phase shifter 204D of FIGS. 5A and 5B and phase shifter 204C of FIG. 2B are adjusted to the next phase setting of π/2. When the plurality of different phase values span a range from 0 degrees to 360 degrees with 15 degree increments, phase shifter 204D of FIGS. 5A and 5B and phase shifter 204C of FIG. 2B are adjusted to the next phase setting of 15 degrees (e.g., the initial value of 0 degrees plus the increment of 15 degrees).

The procedure of FIG. 7 continues from step 740 to step 745. At step 745, the power of at least the power sensor, on the antenna path of the selected antenna with the phase shifter that is set to the next phase setting, is measured and stored. For the example of FIGS. 5A and 5B, the power is measured by at least sensor 203G when phase shifter 204D is set to the next phase setting (e.g., π/2 or 15 degrees). The measured power is calibrated using the coefficients of the polynomial function identified for power sensor 203G in FIG. 6. That is, the coefficient calibrated power measurement of power sensor 203G is obtained based on phase shifter 204D being set to the next phase setting.

For the example of FIG. 2B, the power is measured by power sensor 203C when phase shifter 204C is set to the next phase setting (e.g., π/2 or 15 degrees). The power measurement is calibrated using the coefficients of the polynomial function identified for power sensor 203C in FIG. 6. That is, the coefficient calibrated power measurement of power sensor 203C is obtained based on phase shifter 204C being set to the next phase setting.

In an embodiment, the coefficient calibrated power measurements that are measured based on the next phase setting may be stored in internal storage (not shown) or external storage (not shown).

The procedure continues from step 745 to step 750. At step 750, the correlation module 214 determines if the next phase setting is the last phase setting. For the example as described herein in relation to FIGS. 5A and 5B, the next phase setting value of π/2 for phase shifter 204D is not the last phase setting when the plurality of phase setting values are 0, π/2, and π. Further, the next phase setting value of 15 degrees for phase shifter 204D is not the last phase setting when the plurality of phase setting values span from 0 degrees to 360 degrees with increments of 15 degrees. Therefore, and in this example, the procedure reverts back to step 740.

At step 740, the phase shifter is adjusted to the next phase setting and at step 745 the coefficient calibrated power of at least the power sensor, on the antenna path of the selected antenna with the phase shifter that is set to the next setting, is measured and stored. As such, and for the example of FIGS. 5A and 5B, phase shifter 204D is adjusted to the next phase setting value of π or 30 degrees, and the coefficient calibrated power of power sensor 203G is measured and stored.

Therefore, and in the example of FIGS. 5A and 5B, the coefficient calibrated power at power sensor 203G is measured and stored for each of the plurality of different phase setting values. Specifically, and when the plurality of phase setting values are 0, π/2, and π, the coefficient calibrated power at power sensor 203G is measured and stored when phase shifter 204D is set to each of 0, π/2, and π. When the plurality of phase setting values span 0 degrees to 360 degrees with increments of 15 degrees, the coefficient calibrated power at power sensor 203G is measured and stored when phase shifter 204D is set to each of 0 degrees, 15 degrees, 30 degrees, 45 degrees, and so forth. When the coefficient calibrated power is measured and stored for each of the plurality of different phase settings for the corresponding phase shifter, the procedure continues from step 750 to step 755.

At step 755, the correlation module 214 determines if all antennas with an antenna path that includes a phase shifter have been selected. For the example of FIGS. 5A and 5B, only antenna 201F includes an antenna path with a phase shifter (e.g., phase shifter 204D). Accordingly, the procedure would continue from step 755 to step 765. However, for the example of FIG. 2B, antenna 201A was selected in step 720 and each of antennas 201B and 201C includes an antenna path with a phase shifter. Therefore, and for the example of FIG. 2, the procedure of FIG. 7 would continue from step 755 to step 760 and one of antennas 201B and 201C is selected.

As a result, each antenna that includes an antenna path with a phase shifter is selected and the coefficient calibrated powers measured at the corresponding power sensor are stored for each of the plurality of different phase settings for the phase shifter. Therefore, and for the example of FIG. 2B, the coefficient calibrated powers at power sensor 20A are measured and stored when antenna 201B is selected and phase shifter 204A is set to each of the plurality of different phase values. Further, the coefficient calibrated powers at power sensor 203B are measured and stored when antenna 201C is selected and phase shifter 204B is set to each of the plurality of different phase values.

Referring back to FIG. 7, the procedure continues from step 755 to step 765 after all antennas with an antenna path that includes a phase shifter are selected. At step 765, the correlation module 214 calculates a relative insertion loss for each phase shifter setting of each phase shifter that corresponds to a unique pair of antennas. For the example of FIGS. 5A and 5B, phase shifter 204D corresponds to unique pair of antennas 201F and 201G. As such, the correlation module 214 calculates a relative insertion loss for phase shifter 204D at each of the plurality of different phase settings (e.g., 0, π/2, and π or 0 degrees to 360 degrees with increments of 15 degrees).

For example, the correlation module 214 calculates a relative insertion loss for phase shifter 204D, corresponding to unique pair of antennas 201F and 201G, at a phase setting of 0. Additionally, the correlation module 214 calculates a relative insertion loss for phase shifter 204D, corresponding to unique pair of antennas 201F and 201G, at a phase setting of π/2. Moreover, the correlation module 214 calculates a relative insertion loss for phase shifter 204D, corresponding to unique pair of antennas 201F and 201G, at a phase setting of π.

In an embodiment, the amplitude corrector and phase shifter may be on different paths to the same corresponding power sensor. For example, and in relation to FIGS. 5A and 5B, amplitude corrector 205D and phase shifter 204D are on different paths to power sensor 203G. When the amplitude corrector and the phase shifter are on different paths, the correlation module 214 may calculate the insertion loss for a phase shifter at a particular phase setting based on:

$$IL_{205D}(204D \text{ Phase Setting}) = $$
$$P_{203G, PowerThrough205DPath}(205D \text{ 0 dB Setting}) - $$
$$P_{203G, PowerThrough204DPath}(204D \text{ Phase Setting})$$

Where $IL_{205D}$ (204D Phase Setting) is the calculated (i.e., determined) insertion loss of phase shifter 204D at a particular phase setting,
$P_{203G, PowerThrough205DPath}$ (205D 0 dB Setting) is the power measured by power sensor 203G when the RF signal travels over the antenna path corresponding to antenna 201G and the amplitude corrector 205D is set to 0 dB, and $P_{203G, PowerThrough204DPath}$ (204D Phase Setting) is the power measured by power sensor 203G when the RF signal travels over the antenna path corresponding to antenna 201F and the phase shifter 204D is set to the particular phase setting.

In an embodiment, the amplitude corrector and phase shifter may be on the same path to the same corresponding power sensor. For example, and in relation to FIG. 2B, amplitude corrector 205C and phase shifter 204C are on the same path to power sensor 203A, where phase shifter 204C corresponds to unique pair of antennas 201A and 201C. When the amplitude corrector and the phase shifter are on the same path, the correlation module 214 may calculate the insertion loss for a phase shifter at a particular phase setting using any of a variety of different calculations/algorithms that accounts for the phase shifter and amplitude corrector being on the same path and also accounts for the other path that does not include the phase shifter or the amplitude corrector.

After the relative insertion loss is calculated for each phase shifter at each phase setting for each unique pair of antennas, the procedure of FIG. 7 ends at step 770.

As will be described in further detail below in relation to FIGS. 8A and 8B, insertion loss corrections corresponding to the determined relative insertion losses calculated for a phase shifter at the plurality of different phase settings can be used to further calibrate the coefficient calibrated power measurements corresponding to a combined power sensor to achieve relative accuracy and linearity between sensors.

For example, and in relation to FIGS. 5A and 5B, the insertion losses are calculated for phase shifter 204D that corresponds to unique pair of antennas 201F and 201G. Insertion loss corrections, corresponding to the insertion losses calculated for phase shifter 204D at the plurality of different phase settings, may be used to adjust amplitude corrector 205D and generate insertion loss calibrated power measurements from the coefficient calibrated power measurements, as will be described in further detail below in relation to FIGS. 8A and 8B. The correlation module 214 may use the insertion loss calibrated power measurements from power sensor 203G to determine phase and amplitude alignment corrections that are used to adjust the insertion loss calibrated power measurements as will be described in further detail below in relation to FIGS. 8A and 8B. As a result, calibrated combined power measurements are generated for power sensor 203G. As such, power sensor 203G is calibrated to generate accurate and reliable calibrated combined power measurements that can be used in estimating the auto-correlation matrix.

Figure 8A:
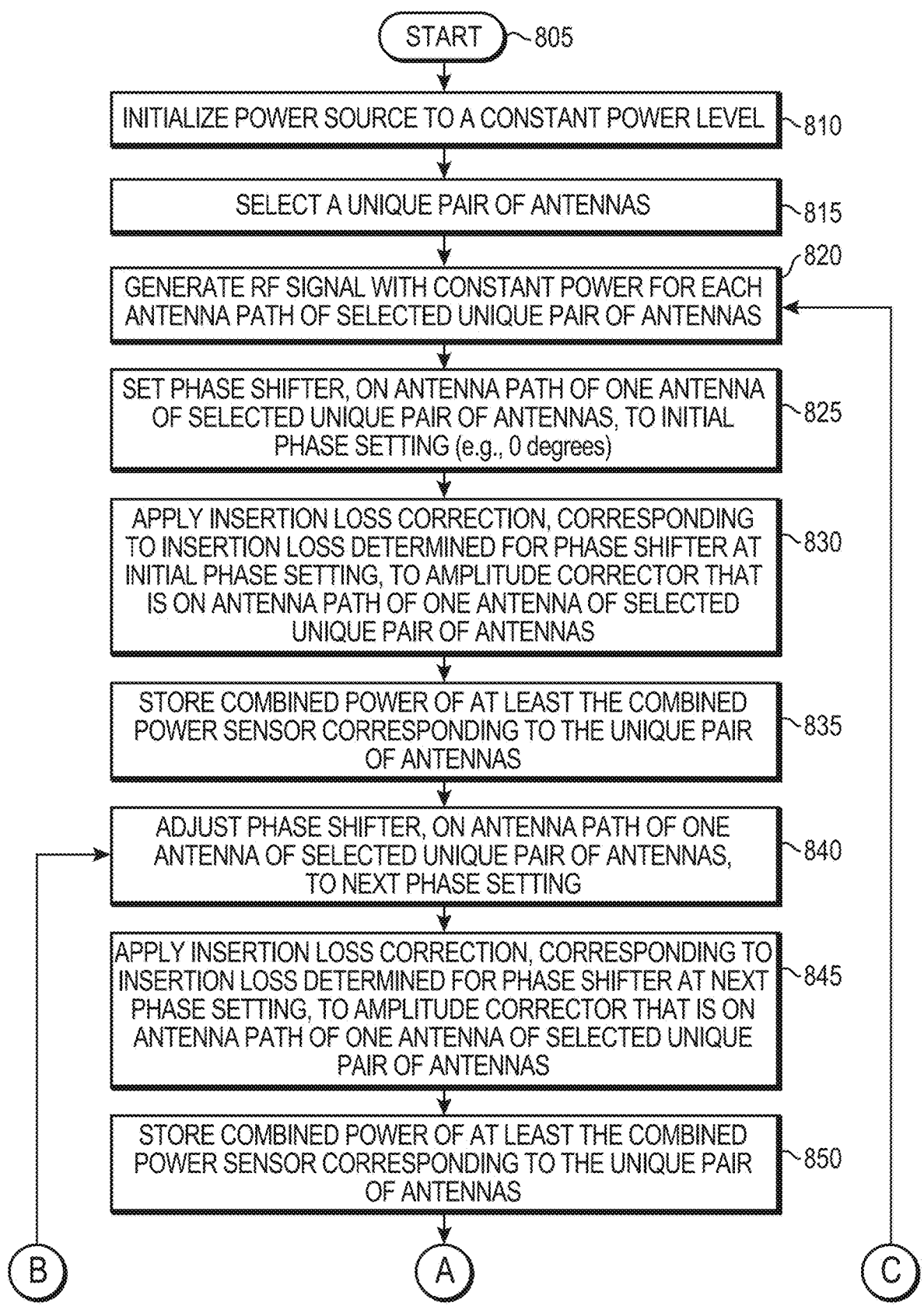
FIGS. 8A and 8B together constitute a flow diagram of a sequence of steps for implementing a phase and amplitude adjustment portion, of the power sensor calibration process, for each unique pair of antennas and then estimating an auto-correlation matrix using calibrated power measurements according to the one or more embodiments as described herein.
Figure 8B:
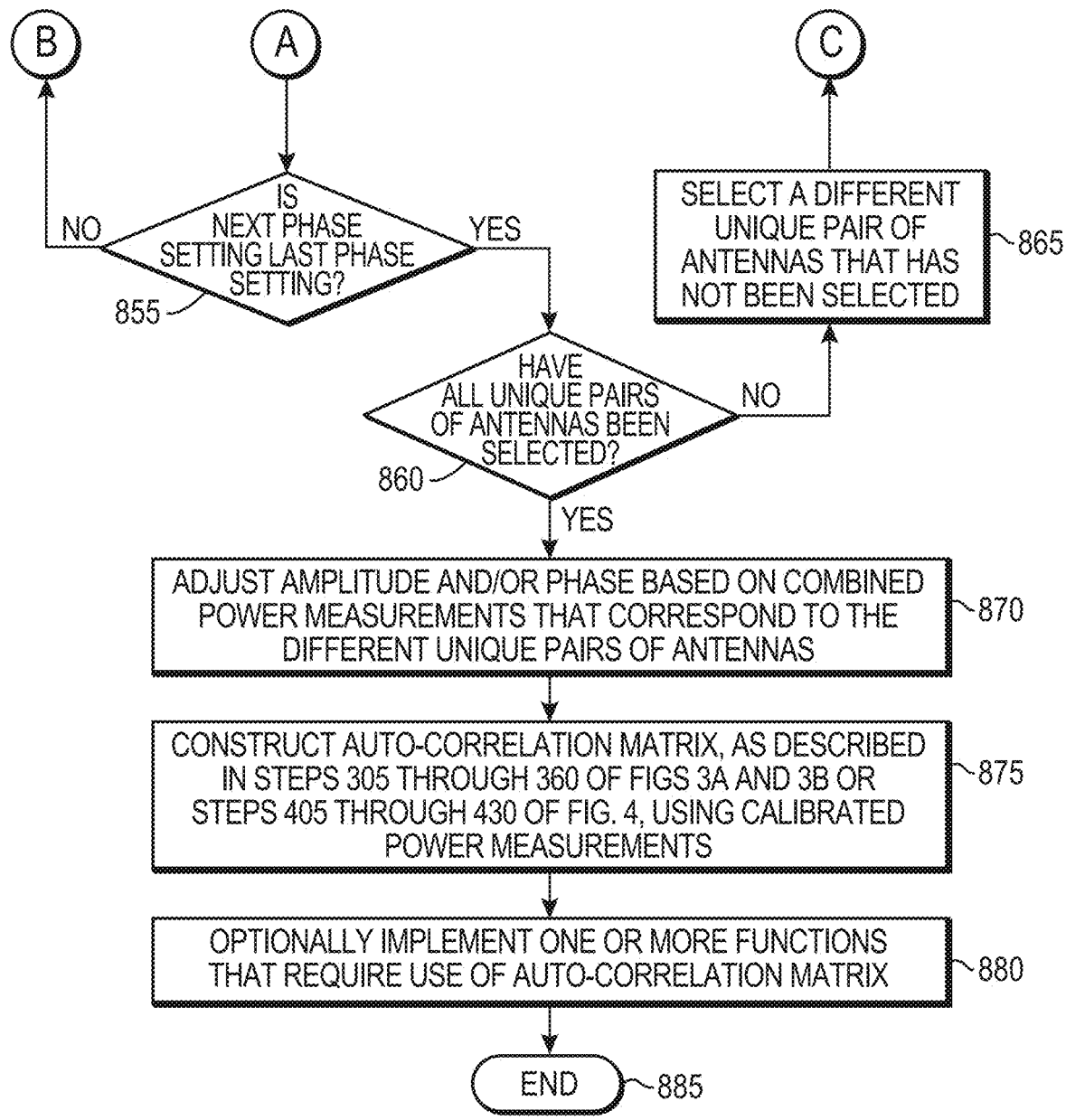

FIGS. 8A and 8B together constitute a flow diagram of a sequence of steps for implementing a phase and amplitude adjustment portion, of the power sensor calibration process, for each unique pair of antennas and then estimating an auto-correlation matrix using calibrated power measurements according to the one or more embodiments as described herein. The flow diagram of FIGS. 8A and 8B address the calibration of combined power sensors. For example, power sensor 203G of FIGS. 5A and 5B is a combined power sensor that is calibrated based on the flow diagram of FIGS. 8A and 8B as will be described in further detail below. Further, power sensors 203A, 203B, and 203C of FIG. 2B are combined power sensors that are calibrated based on the flow diagram of FIGS. 8A and 8B as will be described in further detail below.

The procedure of FIGS. 8A and 8B starts at step 805 and continues to step 810. At step 810, the power source is initialized to a constant power level. The power source may be initialized to a constant power level in a similar manner as described above in relation to step 715 of FIG. 7.

The procedure continues from step 810 to step 815. At step 815, the correlation module 214 selects a unique pair of antennas. For the example of FIGS. 5A and 5B, the only unique pair of antennas is antennas 201F and 201G. As such, the correlation module 214 selects unique pair of antennas 201F and 201G. For the example of FIG. 2B, there are three unique pair of antennas, namely, unique pair of antennas 201A and 201B, antennas 201B and 201C, and antennas 201A and 201C. For the example of FIG. 2B, let it be assumed that correlation module 214 selects unique pair of antennas 201A and 201C.

The procedure continues from step 815 to step 820. At step 820, an RF signal is generated with the constant power for each antenna path of the selected unique pair of antennas.

For the example of FIGS. 5A and 5B, the generated RF signal with constant power is provided to the port of antenna 201F and the port of antenna 201G via the RF switch matrix 503. As such, the generated RF signal travels over the two paths of antenna 201F and the two paths of antenna 201G. For the example of FIG. 2B, the generated RF signal with constant power is provided to the port of antenna 201A and the port of antenna 201C via the RF switch matrix 503. As such, the generated RF signal travels over the three paths of antenna 201A and the three paths of antenna 201C. Because the generated RF signal is not provided to the port of antenna 201B, the generated RF signal does not travel over the three paths of antenna 201B.

The procedure continues from step 820 to step 825. At step 825, the phase shifter on the antenna path of one antenna of the selected unique pair of antennas is set to an initial value. For the example of FIGS. 5A and 5B, phase shifter 204D is on an antenna path of antenna 201F of selected unique pair of antennas 201F and 201G. As such, phase shifter 204D is set to the initial value. For the example of FIG. 2B, phase shifter 204C is on an antenna path of antenna 201A of selected unique pair of antennas 201A and 201C. As such, phase shifter 204C is set to the initial value. In an embodiment, the initial value is 0 (e.g., 0 degrees or 0 radians). The phase shifter may be set to the initial value in a similar manner as described above in relation to step 730 of FIG. 7.

The procedure continues from step 825 to step 830. At step 830, the correlation module 214 applies an insertion loss correction, corresponding to the insertion loss determined for the phase shifter at the initial value, to an amplitude corrector that is on an antenna path of one of the antennas of the selected unique pair of antennas. In an embodiment, the correlation module 214 applies the insertion loss correction to the amplitude corrector by adjusting (i.e., calibrating) the coefficient calibrated power measurement of the corresponding combined power sensor with the insertion loss correction. By adjusting the coefficient calibrated power measurement with the insertion loss correction, the correlation module 214 accounts for the insertion loss when the corresponding power sensor (e.g., combined power sensor) makes a power measurement. The generated power measurements, which are the coefficient calibrated power measurements that are further calibrated using the insertion losses, may be referred to as insertion loss calibrated power measurements.

As described above in relation to FIG. 7, the insertion loss for each phase shifter is determined for each of a plurality of different phase settings. The insertion loss determined from FIG. 7 for the initial phase setting value can be used at step 830. For the example of FIGS. 5A and 5B, the phase shifter 204D is determined to have an insertion loss at the phase setting of 0 (e.g., 0 degrees or 0 radians) based on the flow diagram of FIG. 7. To that end, the correlation module 214 adjusts the coefficient calibrated power measurement of power sensor 203G with the insertion loss correction when phase shifter 204D is at the phase setting of 0.

Specifically, the generated RF signal with constant power is provided to the ports of antennas 201F and 201G. As a result, the generated RF signal travels over the path, from antenna 201F to power sensor 203G, that includes phase shifter 204D that is set to the initial value of 0. Additionally, the generated RF signal travels over the path, from antenna 201G to power sensor 203G, which includes amplitude corrector 205D.

As such, power sensor 203G measures the combined power based on the generated RF signal that travels over the two paths to power sensor 203G, where one path includes phase shifter 204D set to the initial value and the other path includes amplitude corrector 205D. The correlation module 214 may calibrate the combined power measured at power sensor 203G, based on the coefficients for power sensor 203G determined in relation to FIG. 6, to generate the coefficient calibrated power measurement. The correlation module 214 may then calibrate the coefficient calibrated power measurement of power sensor 203G, using the insertion loss correction for the insertion loss determined for phase shifter 204D at the initial value, to generate an insertion loss calibrated power measurement.

Therefore, and when power sensor 203G makes a combined power measurement based on the signals received at the ports of both antennas 201F and 201D, the utilized insertion loss correction can account for the insertion loss of phase shifter 204D that is on a path from antenna 201F to power sensor 203G.

As another example, consider phase shifter 204C and amplitude corrector 205C that are on the same path from antenna 201A to power sensor 203C. The phase shifter 204C is determined to have an insertion loss at the phase setting of 0 based on the flow diagram of FIG. 7. To that end, the correlation module 214 adjusts the coefficient calibrated power measurement of power sensor 203C with the insertion loss correction when phase shifter 204C is at the phase setting of 0.

Specifically, the generated RF signal with constant power is provided to the ports of antennas 201A and 201C. As a result, the generated RF signal travels over the path, from antenna 201A to power sensor 203C, which includes both phase shifter 204C set at the initial value and amplitude corrector 205C. Additionally, the generated RF signal travels over the path from antenna 201C to power sensor 203C.

Therefore, power sensor 203C measures the combined power and the correlation module 214 calibrates the combined power based on the coefficients for power sensor 203C to generate the coefficient calibrated power measurement. The correlation module 214 may then calibrate the coefficient calibrated power measurement, using the insertion loss correction for the insertion loss determined for phase shifter 204C at the initial value, to generate an insertion loss calibrated power measurement.

Therefore, and when power sensor 203C makes a combined power measurement based on the signals received at the ports of both antennas 201A and 201C, the utilized insertion loss correction can account for the insertion loss of phase shifter 204C that is on the same path from antenna 201A to power sensor 203C.

The procedure continues from step 830 to step 835. At step 835, the combined power (e.g., insertion loss calibrated power measurement) of at least the power sensor corresponding to the selected unique pair of antennas is stored. In an embodiment, the storage of the insertion loss calibrated power measurements is similar to that which is described in step 735 of FIG. 7.

For the example of FIGS. 5A and 5B, power sensor 203G corresponds to the selected unique pair of antennas 201F and 201G. Therefore, at least the combined power (e.g., insertion loss calibrated power measurement) for power sensor 203G is stored.

The procedure continues from 835 to step 840 and the phase shifter, on the antenna path of one antenna of the selected unique pair of antennas, is adjusted to a next phase setting. For the example of FIGS. 5A and 5B, phase shifter 204D is adjusted to a next phase setting. For the example of FIG. 2B, phase shifter 204C is adjusted to a next phase setting. In an embodiment, phase setting values iteratively used in relation to FIGS. 8A and 8B are the same as the plurality of different phase setting values used in relation to FIG. 7 to determine insertion losses for each phase shifter. For example, the next phase setting may be $\pi/2$ or 15 degrees. The phase shifter may be set to a next phase setting in a similar manner as described above in relation to step 740 of FIG. 7.

The procedure continues from step 840 to step 845. At step 845, the correlation module 214 applies an insertion loss correction, corresponding to the insertion loss determined for the phase shifter at the next phase setting, to an amplitude corrector that is on an antenna path of one of the antennas of the selected unique pair of antennas. In an embodiment, the correlation module 214 applies the insertion loss correction in a similar manner as described above in relation to step 830 of FIG. 8.

For the example of FIGS. 5A and 5B, the insertion loss correction, for the insertion loss determined for phase shifter 204D at the next phase setting (e.g., $\pi/2$ or 15 degrees), is applied to amplitude corrector 205D. Specifically, the correlation module 214 calibrates the coefficient calibrated power measurement of power sensor 203G, using the insertion loss correction for the insertion loss determined for phase shifter 204D at the next phase setting, to generate an insertion loss calibrated power measurement. For the example of FIG. 2B, the correlation module 214 calibrates the coefficient calibrated power measurements of power sensor 203C, using the insertion loss correction for the insertion loss determined for phase shifter 204C at the next phase setting (e.g., $\pi/2$ or 15 degrees), to generate an insertion loss calibrated power measurement.

The procedure continues from step 845 to step 850. At step 850, at least the combined power (e.g., insertion loss calibrated power measurement) of the power sensor corresponding to the selected unique pair of antennas is stored. In an embodiment, the storage of the insertion loss calibrated power measurements is similar to that which is described in step 735 of FIG. 7.

The procedure continues from step 850 to step 855 of FIG. 8B. At step 855, the correlation module 214 determines if the next phase setting is the last phase setting. The correlation module 214 may determine if the next phase setting is the last phase setting in a similar manner as described above in relation to step 750 of FIG. 7. For the example as described in relation to FIGS. 5A and 5B, the next phase setting value of $\pi/2$ or 15 degrees is not the last phase setting of either $\pi$ or 360 degrees. Therefore, and in this example, the procedure reverts back to step 840.

At step 840, the phase shifter is adjusted to the next phase setting (e.g., $\pi$ or 30 degrees) and at step 845 the insertion loss correction, corresponding to the insertion loss determined for the phase shifter at the next phase setting (e.g., $\pi$ or 30 degrees), is applied to the amplitude corrector that is on the antenna path of one antenna of the selected unique pair of antennas. Then, at step 850, at least the insertion loss calibrated power measurement of the power sensor corresponding to the selected unique pair of antennas is stored in a similar manner as described above in relation to step 835.

For the example of FIGS. 5A and 5B, phase shifter 204D is adjusted to the next phase setting of $\pi$ or 30 degrees at step 840 and amplitude corrector 205D is applied the insertion loss correction for phase shifter 204D set to the phase setting of $\pi$ or 30 at step 845. At least the insertion loss calibrated power measurement for power sensor 203G is then stored at step 850.

Accordingly, the correlation module 214 calibrates the coefficient calibrated power measurement of power sensor 203G, for each of the plurality of different phase settings for phase shifter 204D, using the insertion loss correction corresponding to that phase setting. As a result, an insertion loss calibrated power measurement is generated for power sensor 203G at each phase setting of phase shifter 204D. Similarly, and for the example of FIG. 2B, the correlation module 214 calibrates the coefficient calibrated power measurement of power sensor 203C, for each of the plurality of different phase settings for phase shifter 204C, using the insertion loss correction corresponding to that phase setting. As a result, an insertion loss calibrated power measurement is generated for power sensor 203C at each phase setting of phase shifter 204C.

When the plurality of insertion loss calibrated power measurements for a power sensor of the selected unique pair of antennas are generated based on the phase shifter being set to the plurality of different phase settings, the procedure continues from step 855 to step 860. At step 860, the correlation module determines if all unique pairs of antennas have been selected.

For the example of FIGS. 2A and 2B, transceiver 200B includes unique pair of antennas 201A and 201B, antennas 201B and 201C, and antennas 201A and 201C. Moreover, unique pair of antennas 201A and 201C was selected at step 815 based on the example as described herein. Therefore, the procedure would continue from step 860 to step 865 and the correlation module 214 would select a different unique pair of antennas. Therefore, and for this example in relation to FIG. 2B, the correlation module 214 would select either unique pair of antennas 201A and 201B or unique pair of antennas 201B and 201C.

As such, the procedure iteratively repeats for each unique pair of antennas. For the example of FIG. 2B, let it be assumed that the procedure first repeats from step 820 for unique pair of antennas 201B and 201C and then 201A and 201B. Therefore, the correlation module 214 generates a plurality of insertion loss calibrated power measurements for power sensor 203B that corresponds to selected unique pair of antennas 201B and 201C as described above. After that, the correlation module 214 generates a plurality of insertion loss calibrated power measurements for power sensor 203A that corresponds to selected unique pair of antennas 201A and 201B as described above.

For the example of FIGS. 5A and 5B, there is only one unique pair of antennas, namely unique pair of antennas 201F and 201G. Since unique pair of antennas 201F and 201G was already selected in step 815, the procedure would continue from step 860 to step 870.

At step 870, the correlation module 214 adjusts the amplitude and/or phase based on the combined power measurements (e.g., insertion loss calibrated power measurements) that correspond to the different unique pairs of antennas. In an embodiment, each of the insertion loss calibrated power measurements may correspond to a particular phase setting that the phase shifter is set to. For example, and with relation to FIG. 2B, the correlation module 214 generates an insertion loss calibrated power measurement for power sensor 203C when phase shifter 204C is set to the initial phase setting of 0 and using the insertion loss correction corresponding to the determined insertion loss. This insertion loss calibrated power measurement corresponds to a phase setting of 0.

Similarly, the correlation module 214 generates an insertion loss calibrated power measurement for power sensor 203C when phase shifter 204C is set to the next phase setting of π/2 or 15 degrees and using the insertion loss correction corresponding to the determined insertion loss. This insertion loss calibrated power measurement corresponds to a phase setting of π/2 or 15 degrees. Each of the other insertion loss calibrated power measurements for power sensor 203C would similarly have a corresponding phase setting.

In an embodiment, each insertion loss calibrated power measurement and corresponding phase setting together may represent a point in space (e.g., 2D). Therefore, the insertion loss calibrated power measurements from power sensor 203C and their corresponding phase setting values may represent a data set for power sensor 203C. The data set for power sensor 203C may be represented as a curve in 2D space, where the x-axis for the curve represents phase settings and the y-axis for the curve represents power (i.e., amplitude). In an embodiment, the correlation module 214 may modify the curve, in terms of amplitude and/or phase, to calibrate power sensor 203C.

For the example of FIG. 2B, there is a different data set for each of power sensor 203A that corresponds to unique pair of antennas 201A and 20B, power sensor 203B corresponds to unique pair of antennas 201B and 201C, and power sensor 203C correspond to unique pair of antennas 201A and 201C. Therefore, each data set for power sensors 203A, 203B, and 203C may be represented as a different curve in 2D space, where the x-axis for the curve represents phase settings and the y-axis for the curve represents power (i.e., amplitude). In an embodiment, the correlation module 214 may modify the three curves, in terms of amplitude and/or phase, to calibrate power sensors 203A, 203B, and 203C.

In an embodiment, the correlation module 214 may implement a relative alignment algorithm to modify a curve in terms of amplitude and/or phase. Specifically, and referring to FIG. 2B, the coefficient calibrated power measurements for power sensors 202A, 202B, and 202C may be substantially linear and have a substantially constant phase value and amplitude value. In an embodiment, the correlation module 214 may utilize the substantially constant phase value and the substantially constant amplitude value as a baseline profile that is used for the relative alignment algorithm.

To that end, the correlation module 214 may identify a maximum value of a curve corresponding to a combined power sensor (e.g., power sensor 203A) in a manner as described herein. For example, the correlation module 214 may identify a maximum value of the curve, corresponding to power sensor 203A, utilizing 0, π/2, and π as described in relation to the flow diagram of FIGS. 3A and 3B. Alternatively, the correlation module 214 may identify the maximum value of the curve, corresponding to power sensor 203A, utilizing the search technique as described in relation to FIG. 4.

Once the maximum value is identified, the correlation module 214 may adjust the amplitude of the curve. Specifically, the correlation module 214 may adjust the amplitude of the curve so that the amplitude of the maximum value is equal to 20*log 10(2) above the substantially constant amplitude value of the baseline profile. The amplitude adjustment to the curve, such that the maximum value's amplitude is equal to 20*log 10(2) above the substantially constant amplitude, is an amplitude alignment correction for the power sensor (e.g., power sensor 203A). The correlation module 214 may adjust the phase of the curve so that the maximum value is at a phase of 0. The adjustment to the phase, such that the maximum value is at a phase of 0, is a phase alignment correction for the power sensor (e.g., power sensor 203A).

The correlation module 214 may determine a phase alignment correction and amplitude alignment correction for each other combined power sensor (e.g., power sensor 203B and power sensor 203C) in a similar manner.

The correlation module 214 may then adjust the amplitude and phase of a combined power measurement using the amplitude alignment correction and the phase alignment correction. For example, correlation module 214 may calibrate the insertion loss calibrated power measurements for a power sensor using the corresponding phase alignment correction and amplitude alignment correction determined for the power sensor.

For example, and for FIG. 2B, the correlation module 214 may calibrate the insertion loss calibrated power measurements for power sensor 203A using the amplitude alignment correction and the phase alignment correction determined for the curve corresponding to power sensor 203A. As a result, the correlation module 214 may generate calibrated combined power measurements for power sensor 203A.

Similarly, the correlation module 214 may calibrate the insertion loss calibrated power measurements for power sensor 203B using the amplitude alignment correction and the phase alignment correction determined for the curve corresponding to power sensor 203B. As a result, the correlation module 214 may generate calibrated combined power measurements for power sensor 203B.

Similarly, the correlation module 214 may calibrate the insertion loss calibrated power measurements for power sensor 203C using the amplitude alignment correction and the phase alignment correction determined for the curve corresponding to power sensor 203C. As a result, the correlation module 214 may generate calibrated combined power measurements for power sensor 203C.

Referring back to FIG. 8, the procedure continues from step 870 to 875. At step 875, the correlation module 214 constructs (i.e., estimates) an auto-correlation matrix, as described in steps 300 through 360 of FIGS. 3A and 3B or steps 400 through 430 of FIG. 4, using calibrated power measurements.

For example, and in relation to FIGS. 5A and 5B, power sensors 202F and 202G make power measurements during normal operation. These power measurements are calibrated by correlation module 214 using the coefficients of the polynomial functions that are identified for power sensors 202F and 202G as described in relation to FIG. 6. Specifically, correlation module 214 applies the coefficients, of the polynomial function identified for power sensor 202F, to the power measurements of power sensor 202F to generate coefficient calibrated power measurements. Similarly, correlation module 214 applies the coefficients, of the polynomial function identified for power sensor 202G, to the power measurements of power sensor 202F to generate coefficient calibrated power measurements. The coefficient calibrated power measurements for power sensors 202F and 202G are calibrated power measurements.

Moreover, power sensor 203G makes power measurements (e.g., combined power measurements) during normal operation. Correlation module 214 applies the coefficients, of the polynomial function identified for power sensor 203G, to the combined power measurements to generate coefficient calibrated power measurements. The correlation module 214 further calibrates the coefficient calibrated power measurements using insertion loss corrections corresponding to the insertion losses determined for phase shifter 204D at the plurality of different phase settings. As a result, insertion loss calibrated power measurements are generated. The correlation module 214 further calibrates the insertion loss calibrated power measurements using the amplitude alignment correction and the phase alignment correction determined for the curve corresponding to power sensor 203G. As a result, calibrated combined power measurements are generated for power sensor 203G.

The correlation module 214 may utilize the calibrated power measurements from power sensors 202F, 202G, and 203G to construct (i.e., estimate) an-auto-correlation matrix for the transceivers of FIGS. 5A and 5B. For example, and at step 875, the correlation module 214 may estimate the auto-correlation matrix for the transceivers of FIGS. 5A and 5B based on the flow diagram of FIGS. 3A and 3B or the flow diagram of FIG. 4 using (1) the coefficient calibrated power measurements (i.e., calibrated power measurements) from power sensors 202F and 202G and (2) the calibrated combined power measurements from power sensor 203G.

The procedure may optionally continue to step 880 and the transceiver optionally implements one or more functions that require the use of an auto-correlation matrix in a similar manner as described in relation to step 365 of FIG. 3. The procedure then ends at step 885.

It should be understood that a wide variety of adaptations and modifications may be made to the techniques. For example, the steps of the flow diagram as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the terms user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

The subject-matter according to the description above may also be considered to comprise the following aspects 1 to 20:

Aspect 1. A method for calibrating a plurality of power sensors of a transceiver, the method comprising:
  receiving a signal from a transmitter at a first antenna and a second antenna of a multi-antenna array coupled to the transceiver;
  calibrating one or more first power measurements made at a first antenna power sensor that is only located on a first antenna path associated with the first antenna, wherein calibrating the one or more first power measurements is based on identifying a first function for the first antenna power sensor;
  calibrating one or more second power measurements made at a second antenna power sensor that is only located on a second antenna path associated with the second antenna, wherein calibrating the one or more second power measurements is based on identifying a second function for the second antenna power sensor;
  calibrating one or more third power measurements made at a third power sensor that is located on a third antenna path associated with the first antenna and a fourth antenna path associated with the second antenna, wherein calibrating the one or more third power measurements is based on (1) determining a plurality of insertion losses for a phase shifter, that is located on the third antenna path or the fourth antenna path, at a plurality of different phase settings with a constant power over the third antenna path or the fourth antenna path, and (2) applying a selected correction for each particular insertion loss by an amplitude corrector, that is located on the third antenna path or the fourth antenna path, when the phase shifter is set to a particular phase setting that corresponds to the particular insertion loss.

Aspect 2. The method of aspect 1, further comprising constructing an auto-correlation matrix for the multi-antenna array using (1) the one or more calibrated first power measurement, (2) the one or more calibrated second power measurements, and (3) the one or more calibrated third power measurements.

Aspect 3. The method of one or more previous aspects, further comprising implementing one or more functions that require use of the auto-correlation matrix.

Aspect 4. The method of one or more previous aspects, wherein the plurality of different phase settings includes 0, $\pi/2$, and $\pi$.

Aspect 5. The method of one or more previous aspects, further comprising:
  receiving a plurality of radio frequency (RF) signals with different power levels over the first antenna path;
  measuring, by the first antenna power sensor, uncalibrated first power measurements based on the plurality of RF signals; and
  identifying the first function for the first antenna power sensor based on determining that the function substantially fits or substantially represents the uncalibrated first power measurements.

Aspect 6. The method of one or more previous aspects, wherein the first function and the second function are different.

Aspect 7. The method of one or more previous aspects, wherein the signal is a navigation signal that is used to compute at least one of position, velocity, attitude, or time.

Aspect 8. The method of one or more previous aspects, wherein the phase shifter is on the third antenna path associated with the first antenna, the method further comprising:
  selecting the first antenna that includes the third antenna path with the phase shifter;
  receiving a first radio frequency (RF) signal with a first constant power level over the third antenna path;
  setting the phase shifter to the plurality of different phase settings; and
  measuring, by the third power sensor, first uncalibrated power measurements based on the first RF signal with the first constant power level and the plurality of different phase settings of the phase shifter to generate a plurality of first uncalibrated measured power output values;
  determining, utilizing the plurality of first uncalibrated measured power output values, the plurality of insertion losses for the phase shifter at the plurality of different phase settings.

Aspect 9. The method of one or more previous aspects, further comprising:
  selecting a unique pair of antennas that includes the first antenna and the second antenna;
  receiving a second RF signal with a second constant power level over the third antenna path and the fourth antenna path;
  applying each selected correction to the amplitude corrector when the phase shifter is set to a particular phase setting that corresponds to the selected insertion loss; and
  measuring, by the third power sensor, a plurality of second uncalibrated measured power output values based on (1) the RF signal being received over the third and the fourth antenna paths, (2) the phase shifter being set to each of the plurality of phase settings, and (3) each selected correction being applied to the amplitude corrector when the phase shifter is set to a corresponding phase setting.

Aspect 10. A transceiver with a multi-antenna array, the transceiver comprising:
  a first antenna and a second antenna of the multi-antenna array configured to receive one or more signals from a transmitter;
  a first antenna power sensor that is only located on a first antenna path associated with the first antenna, the first antenna power sensor configured to make one or more first power measurements based on the one or more signals received at the first antenna;
  a second antenna power sensor that is only located on a second antenna path associated with the second antenna, the second antenna power sensor configured to make one or more second power measurements based on the one or more signals received at the second antenna;
  a third power sensor that is located on a third antenna path associated with the first antenna and a fourth antenna path associated with the second antenna, the third power sensor configured to make one or more third power measurements based on the one or more signals received at the first antenna and the second antenna;
  a phase shifter that is located on the third antenna path or the fourth antenna path;
  an amplitude corrector that is located on the third antenna path or the fourth antenna path;
  a processor executing a software module, the software module configured to:
    calibrate the one or more first power measurements using a first function that substantially fits or substantially represents first uncalibrated power measurements made by the first power sensor, wherein calibrating the one or more first power measurements generates one or more first calibrated power measurements,
    calibrate the one or more second power measurements using a second function that substantially fits or substantially represents second uncalibrated power measurements made by the second power sensor, wherein calibrating the one or more second power measurements generates one or more second calibrated power measurements, and
    calibrate the one or more third power measurements to generate one or more third calibrated power measurements by determining a plurality of insertion losses for the phase shifter at a plurality of different phase settings and applying a particular insertion loss correction, corresponding to each of the plurality of insertion losses, to the amplitude corrector when the phase shifter is set to a particular phase setting that corresponds to the particular insertion loss correction.

Aspect 11. The transceiver of aspect 10, wherein the software module is further configured to construct an auto-correlation matrix for the multi-antenna array using (1) the one or more first calibrated power measurement, (2) the one or more second calibrated power measurements, and (3) the one or more third calibrated power measurements.

Aspect 12. The transceiver of one or more of aspects 10 to 11, wherein the software module is further configured to implement one or more functions that require use of the auto-correlation matrix.

Aspect 13. The transceiver of one or more of aspects 10 to 12, wherein the plurality of different phase settings includes 0, $\pi/2$, and $\pi$.

Aspect 14. The transceiver of one or more of aspects 10 to 13, further comprising: the first antenna path configured to receive a plurality of radio frequency (RF) signals with different power levels;
  the first antenna power sensor further configured to measure the first uncalibrated power measurements based on the plurality of RF signals;
  the software module further configured to
    identify a first polynomial function as the first function for the first antenna power sensor based on determining that the first polynomial function substantially fits the first uncalibrated power measurements; and
    apply coefficients associated with the first polynomial function to the one or more first power measurements to generate the one or more first calibrated power measurements.

Aspect 15. The transceiver of one or more of aspects 10 to 14, wherein the first function and the second function are different.

Aspect 16. The transceiver of one or more of aspects 10 to 15, wherein the one or more signals are navigation signals that are used to compute one of position, velocity, attitude, or time.

Aspect 17. The transceiver of one or more of aspects 10 to 16, wherein the phase shifter is on the third antenna path associated with the first antenna, the transceiver further comprising:
  the third antenna path configured to receive a first radio frequency (RF) signal with a first constant power level;
  the software module further configured to set the phase shifter to the plurality of different phase settings; and
  the third power sensor further configured to measure first uncalibrated power measurements based on the first RF signal with the first constant power level and the plurality of different phase settings of the phase shifter to generate a plurality of first uncalibrated measured power output values;
  the software module further configured to determine, utilizing the plurality of first uncalibrated measured power output values, the plurality of insertion losses for the phase shifter at the plurality of different phase settings.

Aspect 18. The transceiver of one or more of aspects 10 to 17, further comprising:
  the third antenna path configured to receive a second RF signal with a second constant power level;

the software module further configured to apply each particular insertion loss correction to the amplitude corrector when the phase shifter is set to a particular phase setting that corresponds to the particular insertion loss correction; and the third power sensor further configured to measure a plurality of second uncalibrated measured power output values based on (1) the RF signal being received over the third and the fourth antenna paths, (2) the phase shifter being set to each of the plurality of phase setting, and (3) each particular insertion loss correction being applied to the amplitude corrector when the phase shifter is set to a corresponding phase setting.

Aspect 19. A transceiver including a multi-antenna array, the transceiver comprising:

a processor executing a software module, the software module configured to select a first antenna of the multi-antenna array that includes at least the first antenna and a second antenna;

at least one first antenna path associated with the first antenna and configured to receive a radio frequency (RF) signal at each of a plurality of different power level values from a lower limit of a range to an upper limit of the range, wherein the at least one first antenna path includes a first power sensor;

the first power sensor configured to measure a first measured power value for the RF signal at each the plurality of different power levels values to generate a plurality of first measured power output values; and the software module further configured to identify a first function that substantially fits or substantially represents the plurality of first measured power output values, wherein the first function is used to adjust first normal operation power measurements made by the first power sensor when a signal is received at the first antenna.

Aspect 20, the transceiver of aspect 1, further comprising:

the software module further configured to select the second antenna;

at least one second antenna path of the second antenna configured to receive the RF signal at the plurality of different power values from the lower limit of the range to the upper limit of the range, wherein the at least one second antenna path travels from a second port of the second antenna to a second power sensor;

the second power sensor configured to measure a second measured power value based on each of the plurality of different power values to generate a plurality of second measured power output values; and the software module further configured to identify a second function that substantially fits or substantially represents the plurality of second measured power output values, wherein the second function is used to adjust second normal operation power measurements made by the second power sensor when the signal is received at the second.

What is claimed is:

1. A method for calibrating a plurality of power sensors of a transceiver, the method comprising:

receiving a signal from a transmitter at a first antenna and a second antenna of a multi-antenna array coupled to the transceiver;

calibrating one or more first power measurements made at a first antenna power sensor that is only located on a first antenna path associated with the first antenna, wherein calibrating the one or more first power measurements is based on identifying a first function for the first antenna power sensor;

calibrating one or more second power measurements made at a second antenna power sensor that is only located on a second antenna path associated with the second antenna, wherein calibrating the one or more second power measurements is based on identifying a second function for the second antenna power sensor;

calibrating one or more third power measurements made at a third power sensor that is located on a third antenna path associated with the first antenna and a fourth antenna path associated with the second antenna, wherein calibrating the one or more third power measurements is based on (1) determining, for a phase shifter that is located on the third antenna path or the fourth antenna path, a plurality of insertion losses for a plurality of different phase settings based on a constant power over the third antenna path or the fourth antenna path, and (2) applying, to an amplitude corrector that is located on the third antenna path or the fourth antenna path, a selected correction for each particular insertion loss of the plurality of insertion losses when the phase shifter is set to a particular phase setting that corresponds to the particular insertion loss.

2. The method of claim 1, further comprising constructing an auto-correlation matrix for the multi-antenna array using (1) the one or more calibrated first power measurements, (2) the one or more calibrated second power measurements, and (3) the one or more calibrated third power measurements.

3. The method of claim 2, further comprising implementing one or more particular functions that require use of the auto-correlation matrix.

4. The method of claim 1, wherein the plurality of different phase settings includes 0, $\pi/2$, and $\pi$.

5. The method of claim 1, further comprising:

receiving a plurality of radio frequency (RF) signals with different power levels over the first antenna path;

measuring, by the first antenna power sensor, uncalibrated first power measurements based on the plurality of RF signals; and identifying the first function for the first antenna power sensor based on determining that the first function substantially fits or substantially represents the uncalibrated first power measurements.

6. The method of claim 1, wherein the first function and the second function are different.

7. The method of claim 1, wherein the signal is a navigation signal that is used to compute at least one of position, velocity, attitude, or time.

8. The method of claim 1, wherein the phase shifter is on the third antenna path associated with the first antenna, the method further comprising:

selecting the first antenna;

receiving a first radio frequency (RF) signal with a first constant power level over the third antenna path;

setting the phase shifter to the plurality of different phase settings; and measuring, by the third power sensor, a plurality of first uncalibrated power measurements based on the first RF signal with the first constant power level and the plurality of different phase settings of the phase shifter;

determining, utilizing the plurality of first uncalibrated measured power output values, the plurality of insertion losses for the phase shifter at the plurality of different phase settings.

9. The method of claim 8, further comprising:
selecting a unique pair of antennas that includes the first antenna and the second antenna;
receiving a second RF signal with a second constant power level over the third antenna path and the fourth antenna path; and
measuring, by the third power sensor, a plurality of second uncalibrated power measurements based on (1) the second RF signal being received over the third and the fourth antenna paths, (2) the phase shifter being set to each of the plurality of phase settings, and (3) the selected correction, corresponding to each of the plurality of insertions losses, being applied to the amplitude corrector when the phase shifter is set to each corresponding phase setting.

10. A transceiver with a multi-antenna array, the transceiver comprising:
a first antenna and a second antenna of the multi-antenna array configured to receive one or more signals from a transmitter;
a first antenna power sensor that is only located on a first antenna path associated with the first antenna, the first antenna power sensor configured to make one or more first power measurements based on the one or more signals received at the first antenna;
a second antenna power sensor that is only located on a second antenna path associated with the second antenna, the second antenna power sensor configured to make one or more second power measurements based on the one or more signals received at the second antenna;
a third power sensor that is located on a third antenna path associated with the first antenna and a fourth antenna path associated with the second antenna, the third power sensor configured to make one or more third power measurements based on the one or more signals received at the first antenna and the second antenna;
a phase shifter that is located on the third antenna path or the fourth antenna path;
an amplitude corrector that is located on the third antenna path or the fourth antenna path;
a processor executing a software module, the software module when executed by the processor configured to:
calibrate the one or more first power measurements using a first function that substantially fits or substantially represents first uncalibrated power measurements made by the first power sensor, wherein calibrating the one or more first power measurements generates one or more first calibrated power measurements,
calibrate the one or more second power measurements using a second function that substantially fits or substantially represents second uncalibrated power measurements made by the second power sensor, wherein calibrating the one or more second power measurements generates one or more second calibrated power measurements, and
calibrate the one or more third power measurements to generate one or more third calibrated power measurements by determining a plurality of insertion losses for the phase shifter at a plurality of different phase settings and applying a particular insertion loss correction, corresponding to each of the plurality of insertion losses, to the amplitude corrector when the phase shifter is set to a particular phase setting that corresponds to the particular insertion loss correction.

11. The transceiver of claim 10, wherein the software module when executed by the processor is further configured to construct an auto-correlation matrix for the multi-antenna array using (1) the one or more first calibrated power measurements, (2) the one or more second calibrated power measurements, and (3) the one or more third calibrated power measurements.

12. The transceiver of claim 11, wherein the software module when executed by the processor is further configured to implement one or more particular functions that require use of the auto-correlation matrix.

13. The transceiver of claim 10, wherein the plurality of different phase settings includes 0, $\pi/2$, and $\pi$.

14. The transceiver of claim 10, further comprising:
the first antenna path configured to receive a plurality of radio frequency (RF) signals with different power levels;
the first antenna power sensor further configured to measure the first uncalibrated power measurements based on the plurality of RF signals;
the software module when executed by the processor further configured to:
identify a first polynomial function as the first function for the first antenna power sensor based on determining that the first polynomial function substantially fits the first uncalibrated power measurements; and
apply coefficients associated with the first polynomial function to the one or more first power measurements to generate the one or more first calibrated power measurements.

15. The transceiver of claim 10, wherein the first function and the second function are different.

16. The transceiver of claim 10, wherein the one or more signals are navigation signals that are used to compute one of position, velocity, attitude, or time.

17. The transceiver of claim 10, wherein the phase shifter is on the third antenna path associated with the first antenna, the transceiver further comprising:
the third antenna path configured to receive a first radio frequency (RF) signal with a first constant power level;
the software module when executed by the processor further configured to set the phase shifter to the plurality of different phase settings; and
the third power sensor further configured to measure a plurality of first uncalibrated power measurements based on the first RF signal with the first constant power level and the plurality of different phase settings of the phase shifter;
the software module when executed by the processor further configured to determine, utilizing the plurality of first uncalibrated power measurements, the plurality of insertion losses for the phase shifter at the plurality of different phase settings.

18. The transceiver of claim 17, further comprising:
the third antenna path configured to receive a second RF signal with a second constant power level; and
the third power sensor further configured to measure a plurality of second uncalibrated power measurements based on (1) the second RF signal being received over the third and the fourth antenna paths, (2) the phase shifter being set to each of the plurality of phase settings, and (3) the particular insertion loss correction, corresponding to each of the plurality of insertions losses, being applied to the amplitude corrector when the phase shifter is set to each corresponding phase setting.

19. A transceiver including a multi-antenna array, the transceiver comprising:
- a processor executing a software module, the software module when executed by the processor configured to select a first antenna of the multi-antenna array that includes at least the first antenna and a second antenna;
- at least one first antenna path associated with the first antenna and configured to receive a radio frequency (RF) signal at each of a plurality of different power level values from a lower limit of a range to an upper limit of the range, wherein the at least one first antenna path includes a first power sensor;
- the first power sensor configured to measure a first measured power value for the RF signal at each of the plurality of different power level values to generate a plurality of first measured power output values; and
- the software module when executed by the processor further configured to identify a first function that substantially fits or substantially represents the plurality of first measured power output values, wherein the first function is used to adjust first normal operation power measurements made by the first power sensor when a signal is received at the first antenna.

20. The transceiver of claim 19, further comprising:
- the software module when executed by the processor further configured to select the second antenna;
- at least one second antenna path of the second antenna configured to receive the RF signal at the plurality of different power level values from the lower limit of the range to the upper limit of the range, wherein the at least one second antenna path travels from a port of the second antenna to a second power sensor;
- the second power sensor configured to measure a second measured power value based on each of the plurality of different power level values to generate a plurality of second measured power output values; and
- the software module when executed by the processor further configured to identify a second function that substantially fits or substantially represents the plurality of second measured power output values, wherein the second function is used to adjust second normal operation power measurements made by the second power sensor when the signal is received at the second antenna.

* * * * *